United States Patent
Lim et al.

(10) Patent No.: US 12,082,303 B2
(45) Date of Patent: Sep. 3, 2024

(54) METHOD AND APPARATUS FOR MOVING PROFILES WITH DIFFERENT VERSIONS DURING DEVICE CHANGE

(71) Applicant: Samsung Electronics Co., Ltd., Suwon-si (KR)

(72) Inventors: Taehyung Lim, Suwon-si (KR); Kangjin Yoon, Suwon-si (KR); Duckey Lee, Suwon-si (KR); Sujung Kang, Suwon-si (KR); Jonghoe Koo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 424 days.

(21) Appl. No.: 17/448,087

(22) Filed: Sep. 20, 2021

(65) Prior Publication Data
US 2022/0095095 A1    Mar. 24, 2022

(30) Foreign Application Priority Data
Sep. 22, 2020    (KR) .......................... 10-2020-0122492

(51) Int. Cl.
*H04W 8/24*    (2009.01)
(52) U.S. Cl.
CPC .................................... *H04W 8/24* (2013.01)
(58) Field of Classification Search
None
See application file for complete search history.

(56) References Cited

U.S. PATENT DOCUMENTS

| | | | |
|---|---|---|---|
| 10,616,754 B2 | 4/2020 | Fan et al. | |
| 11,146,948 B1* | 10/2021 | Uehling | H04W 12/30 |
| 2019/0069248 A1 | 2/2019 | Singh et al. | |
| 2019/0174299 A1* | 6/2019 | Ullah | H04L 63/102 |
| 2019/0335319 A1 | 10/2019 | Li | |

(Continued)

FOREIGN PATENT DOCUMENTS

| | | |
|---|---|---|
| EP | 3413685 A1 | 12/2018 |
| EP | 3890378 A1 | 10/2021 |

(Continued)

OTHER PUBLICATIONS

International Search Report and Written Opinion of the International Searching Authority dated Dec. 16, 2021, in connection with International Application No. PCT/KR2021/012777, 7 pages.

(Continued)

*Primary Examiner* — Barry W Taylor

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. The disclosure provides a method and apparatus which enable a device change when two devices supporting device change methods having different versions attempt a device change.

18 Claims, 12 Drawing Sheets

(56) References Cited

U.S. PATENT DOCUMENTS

| | | | |
|---|---|---|---|
| 2020/0059778 A1* | 2/2020 | Li | H04W 12/06 |
| 2020/0169870 A1* | 5/2020 | Lucas | H04W 8/265 |
| 2022/0078615 A1 | 3/2022 | Lee et al. | |
| 2023/0171585 A1* | 6/2023 | Padova | H04W 8/183 |
| | | | 455/558 |
| 2023/0403563 A1* | 12/2023 | Lee | H04W 12/72 |

FOREIGN PATENT DOCUMENTS

| | | |
|---|---|---|
| KR | 10-2020-0101257 A | 8/2020 |
| WO | 2020171475 A1 | 8/2020 |
| WO | 2020184995 A1 | 9/2020 |

OTHER PUBLICATIONS

Supplementary European Search Report dated Jan. 15, 2024, in connection with European Patent Application No. 218272844.2, 12 pages.

GSM Association, "SGP.21—RSP Architecture", Dec. 23, 2015, 52 pages.

\* cited by examiner

METHOD AND APPARATUS FOR MOVING PROFILES WITH DIFFERENT VERSIONS DURING DEVICE CHANGE

CROSS-REFERENCE TO RELATED APPLICATION

This application is based on and claims priority under 35 U.S.C. § 119(a) of a Korean patent application number 10-2020-0122492, filed on Sep. 22, 2020, in the Korean Intellectual Property Office, the disclosure of which is incorporated by reference herein in its entirety.

BACKGROUND

1. Field

The disclosure relates to a smart security medium, and more particularly, to a method and apparatus for a device change between smart security media supporting device change methods having different versions.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

As described above, as various services can be provided with the development of a mobile communication system, there is a need for a scheme for effectively providing these services. For example, there is a need for a method of transferring a profile or a service associated with the profile when a device is changed. Furthermore, when different device change methods are present and two devices support different device change methods, there is a need for a method capable of supporting a device change between two devices.

SUMMARY

Embodiments of the present disclosure provide provides a method of performing a device change for solving a problem which may occur because device change methods are different between two electronic devices when a device change is to be performed between security modules included in the two electronic devices, and an apparatus capable of performing the method.

According to an embodiment of the disclosure, a method performed by a first device of a first version in a communication system is provided. The method of the first device includes: identifying that a profile of the first device is to be downloaded in a second device of the first version or a second version; identifying, based on a first code for the first version and a second code for the second version, a third code used for downloading the profile; transmitting, to the second device, the third code; and transmitting, to a profile server, the profile based on a transmission of the third code.

According to an embodiment of the disclosure, a method performed by a second device of a first version or a second version in a communication is provided. The method of the second device includes: receiving, from a first device of the first version, a third code used for downloading a profile of the first device, the third code being identified based on a first code for the first version, and a second code for the second version; in case that a version of the second device is the first version, transmitting, to a profile server, the first code from the third code; in case that the version of the second device is the second version, transmitting, to the profile server, the second code from the third code; and receiving, the profile server, the profile based on a transmission of the first code or the second code.

According to an embodiment of the disclosure, a method performed by a profile server in a communication system is provided. The method of the profile server includes: receiving, from a second device of a first version or a second version, one of a first code or a second code; identifying a version of a first device in which a profile to be downloaded in the second device is installed based on the first code or the second code; receiving, from the first device, the profile based on an identification for the version of the first device; and transmitting, to the second device, the profile.

According to an embodiment of the disclosure, a first UE of a first version in a communication is provided. The first UE comprises: a transceiver; and a processor configured to: identify that a profile of the first device is to be downloaded in a second device of the first version or a second version, identify, based on a first code for the first version and a second code for the second version, a third code used for downloading the profile, transmit, to the second device via the transceiver, the third code, and transmit, to a profile server via the transceiver, the profile based on a transmission of the third code.

According to an embodiment of the disclosure, a second UE of a first version or a second version in a communication is provided. The second UE comprises: a transceiver; and a processor configured to: receive, from a first device of the first version via the transceiver, a third code used for downloading a profile of the first device, the third code being identified based on a first code for the first version, and a second code for the second version, in case that a version of the second device is the first version, transmit, to a profile server via the transceiver, the first code from the third code, in case that the version of the second device is the second version, transmit, to the profile server via the transceiver, the second code from the third code, and receive, the profile server via the transceiver, the profile based on a transmission of the first code or the second code.

According to an embodiment of the disclosure, a profile server in a communication system is provided. The profile server comprises: a transceiver; and a processor configured to: receive, from a second device of a first version or a second version via the transceiver, one of a first code or a second code, identify a version of a first device in which a profile to be downloaded in the second device is installed based on the first code or the second code, receive, from the first device via the transceiver, the profile based on an identification for the version of the first device; and transmit, to the second device via the transceiver, the profile.

According to various embodiments of the disclosure, a device change can be performed between two devices supporting device change methods having different versions.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the disclosure will be more apparent from the following detailed description, taken in conjunction with the accompanying drawings, in which.

DETAILED DESCRIPTION

Figure 1:
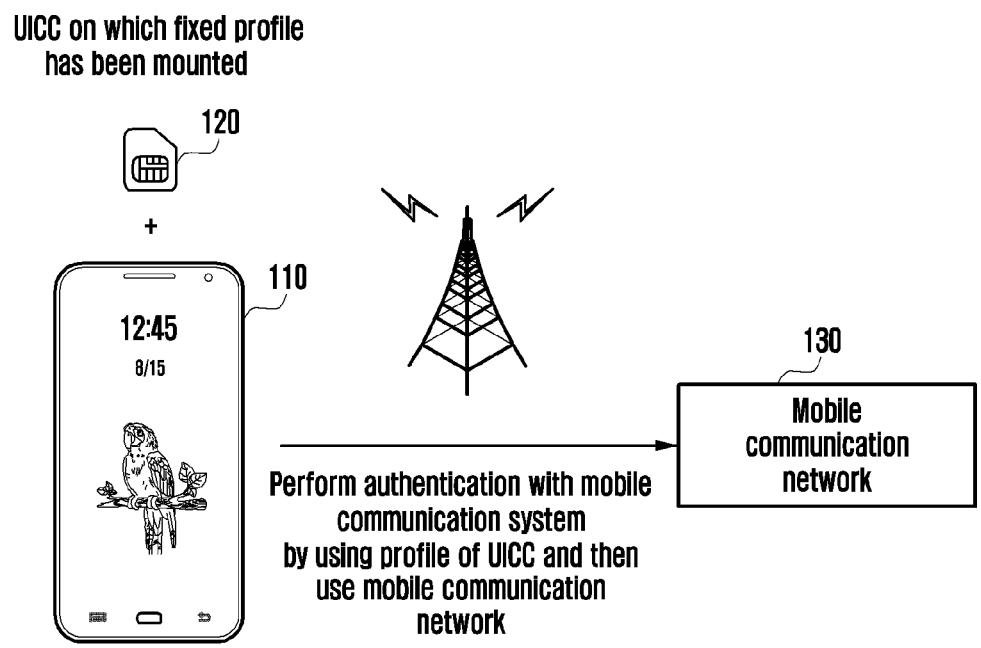
FIG. 1 is a diagram illustrating a method of connecting, by a device using a UICC on which a fixed profile has been mounted, a mobile communication network according to an embodiment of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure are described in detail with reference to the accompanying drawings.

In describing the embodiments, a description of technology contents that are well known in the art to which the disclosure pertains and that are not directly related to the disclosure is omitted in order to clearly deliver the gist of the disclosure without obscuring the gist of the disclosure by omitting an unnecessary description.

For the same reason, in the accompanying drawings, some components are enlarged, omitted or schematically depicted. Furthermore, the size of each component does not accurately reflect its real size. In the drawings, the same or similar components are assigned the same reference numerals.

Advantages and characteristics of the disclosure and a method for achieving the advantages and characteristics will become apparent from the embodiments described in detail in conjunction with the accompanying drawings. However, the disclosure is not limited to the disclosed embodiments, but may be implemented in various different forms. The embodiments are provided to only complete the disclosure and to fully notify a person having ordinary knowledge in the art to which the disclosure pertains of the category of the disclosure. The disclosure is defined by the category of the claims. Throughout the specification, the same reference numerals denote the same components.

In the disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing equipment, so that the instructions executed by the processor of the computer or other programmable data processing equipment create means for executing the functions specified in the flowchart block(s). These computer program instructions may also be stored in a computer-usable or computer-readable storage medium that can direct a computer or other programmable data processing equipment to implement a function in a particular manner, such that the instructions stored in the computer-usable or computer-readable memory produce an article of manufacture including instruction means that implement the function specified in the flowchart block(s). The computer program instructions may also be loaded on a computer or other programmable data processing equipment to cause a series of operational steps to be performed on the computer or other programmable data processing equipment to produce a computer-executed process, so that the instructions performing the computer or other programmable data processing equipment provide steps for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

The term "unit", as used in the present embodiment means software or a hardware component, such as an FPGA or an ASIC, and the "unit" performs specific tasks. However, the term "~unit" does not mean that it is limited to software or hardware. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units". Furthermore, the components and "units" may be implemented to operate on one or more CPUs within a device or a security multimedia card.

In the disclosure, a modifier, such as a first or a second denoting a term, may be used to distinguish between terms in describing an embodiment. A term modified by a modifier, such as a first or a second, may denote a different target. However, a term modified by a modifier, such as a first or a second, may denote the same target. That is, a modifier, such as a first or a second, may be used to denote the same target from a different viewpoint. For example, a modifier, such as a first or a second, may be used to distinguish between the same targets from a functional aspect or an operational aspect. For example, a first end user and a second end user may denote the same user.

Furthermore, in the disclosure, embodiments are described by taking a universal integrated circuit card (UICC) as an example of a security medium, but the scope of rights of the disclosure is not limited to the UICC. For example, it is evident to those skilled in a corresponding technical field that various embodiments to be described hereinafter may be identically or similarly applied to another security medium that performs substantially the same or similar function as the UICC.

Specific terms used in embodiments of the disclosure are provided to help understanding of the disclosure. The use of such a specific term may be changed into another form without departing from the technical spirit of the disclosure.

A "UICC" is a smart key inserted and used in a mobile communication terminal, etc., and may also be denoted as a UICC card. The UICC may mean a chip in which personal information, such as network access authentication information of a mobile communication subscriber, a telephone directory, and SMS, is stored and which enables the safe use of mobile communication by performing subscriber authentication and the generation of a traffic security key upon access to a mobile communication network, such as GSM, WCDMA, or LTE.

The UICC may include an access control module for accessing a network of a mobile operator. Examples of the access control module include a universal subscriber identity module (USIM), a subscriber identity module (SIM), an IP multimedia service identity module (ISIM), etc. A UICC including a USIM may be commonly denoted as a USIM card. Likewise, a UICC including a SIM module may be commonly denoted as a SIM card. In the disclosure, a "SIM card," a "UICC card," a "USIM card," a "UICC including an ISIM" may be used as the same meaning. That is, the contents of the disclosure may be identically applied to a SIM card, a USIM card, an ISIM card or a common UICC card.

The SIM module may be mounted upon fabrication of a UICC or a SIM module for a mobile communication service to be used by a user at desired timing may be downloaded from a UICC card. Furthermore, a plurality of SIM modules may be downloaded and installed in the UICC card. At least one of the SIM modules may be selected and used. Such a UICC card may be fixed or may not be fixed to a device. A UICC fixed and used in a device is called an embedded UICC (eUICC). In particular, a UICC embedded in a communication processor of a device, an application processor or a system-on-chip (SoC) including a single processor structure in which the two processors are integrated is denoted as an integrated UICC (iUICC). In general, the eUICC and the iUICC may mean a UICC card, which is fixed and used in a device and includes a function for enabling at least one SIM module to be remotely downloaded onto the UICC and any one of the downloaded SIM modules to be selected. In the disclosure, a UICC card having a function for enabling at least one SIM module to be downloaded and selected may be denoted as an eUICC or an iUICC. That is, a UICC card fixed or not fixed to a device among UICC cards having a function for enabling a SIM module to be remotely downloaded and selected may be collectively denoted an eUICC or an iUICC.

In the disclosure, the term "UICC" may be interchangeably used with a SIM. The term "eUICC" may be interchangeably used with an eSIM.

An "eUICC ID" may be an object ID of an eUICC embedded in a device, and may be denoted as an EID. Furthermore, if a provisioning profile has been previously mounted on an eUICC, an eUICC ID may be a profile ID of the corresponding provisioning profile. Furthermore, in an embodiment of the disclosure, if a device and an eUICC chip are not separated, an eUICC ID may be a device ID. Furthermore, an eUICC ID may denote a specific secure domain of an eUICC chip.

A "profile" may mean a data object, such as an application, a file system, or an authentication key value stored in an UICC.

In the disclosure, a "profile package" may mean that the contents of a "profile" have been packaged in the form of software which may be installed in a UICC. The "profile package" may be named a profile TLV or a profile package TLV. If a profile package has been encrypted using an encryption parameter, the profile package may be named a protected profile package (PPP) or a protected profile package TLV (PPP TLV). If a profile package has been encrypted using an encryption parameter which may be decoded by only a specific eUICC, the profile package may be named a bound profile package (BPP) or a bound profile package TLV (BPP TLV). The profile package TLV may be a data set that represents information constituting a profile in a tag, length, value (TLV) form.

In the disclosure, a "profile image" may mean binary data having a profile package installed in a UICC. The "profile image" may be named a profile TLV or a profile image TLV If a profile image has been encrypted using an encryption parameter, the "profile image" may be named a protected profile image (PPI) or a PPI TLV. If a profile image has been encrypted using an encryption parameter which may be decoded by only a specific eUICC, the "profile image" may be named a bound profile image (BPI) or a bound profile image TLV (BPI TLV). A profile image TLV may be a data set that represents information constituting a profile in a tag, length, value (TLV) form.

In the disclosure, a "state" of a profile may be as follows.

In the disclosure, an operation of enabling (activating), by a device, a profile may mean an operation of configuring a communication service so that the device can receive the communication service through a mobile operator that has provided a profile by changing a state of the profile to an enabled state. A profile in the enabled state may be represented as an "enabled profile."

In the disclosure, an operation of disabling (deactivating), by a device, a profile may mean an operation of configuring a communication service so that the device cannot receive the communication service through a mobile operator that has provided a profile by changing a state of the profile to a disabled state. A profile in the disabled state may be represented in a "disabled profile."

In the disclosure, an operation of deleting, by a device, a profile may mean an operation of configuring a profile so that a device no longer enables or disables the profile by changing a state of the profile to a deleted state. A profile in the deleted state may be represented as a "deleted profile."

In the disclosure, an operation of enabling, disabling, or deleting, by a device, a profile may mean an operation of first marking a state of each profile as a to-be-enabled state, a to-be-disabled state, or a to-be-deleted state without immediately changing the state of each profile into the enabled state, the disabled state, or the deleted state, performing, by a device to a UICC of the device, a specific operation (e.g., performing a REFRESH or RESET command), and then changing the state of each profile into the enabled state, the disabled state, or the deleted state. An operation of marking a state of a specific profile as a to-be state (i.e., the to-be-enabled state, the to-be-disabled state, or the to-be-deleted state) is not essentially limited to marking a state of one profile as one to-be state. States of one or more profiles may be marked as the same or different to-be states, a state of one profile may be marked as one or more to-be states, or states of one or more profiles may be marked as the same or different one or more to-be states.

Furthermore, if a device marks a state of a given profile as one or more to-be state, two to-be state marks may be integrated into one. For example, if a state of a given profile is marked as the to-be-disabled state and the to-be-deleted state, a state of the corresponding profile may be integrated and marked as the to-be-disabled and deleted state.

Furthermore, an operation of marking, by a device, to-be states of one or more profiles may be sequentially or simultaneously performed. Furthermore, an operation of changing, by a device, an actual state of a profile after marking to-be states of one or more profiles may be sequentially or simultaneously performed.

A "profile discriminator" may be denoted as a factor matched with a profile ID, an integrated circuit card ID (ICCID), a matching ID, an event ID, an activation code, an activation code token, a command code, a command code token, a signed command code, an unsigned command code, an ISD-P or a profile domain (PD). The profile ID may indicate an object ID of each profile. The profile discriminator may further include an address of a profile providing server (SM-DP+) capable of indexing a profile. Furthermore, the profile discriminator may further include a signature of a profile providing server (SM-DP+).

A "remote SIM provisioning (RSP) server" may be used to denote a profile providing server and/or a profile management server and/or a subscription relay server to be described later. The RSP server may be denoted as a subscription manager XX (SM-XX).

In the disclosure, a "profile providing server" may include a function for generating a profile, encrypting a generated profile, generating a profile remote management command, or encrypting a generated profile remote management command. The profile providing server may be represented as subscription manager data preparation (SM-DP), subscription manager data preparation plus (SM-DP+), an off-card entity of a profile domain, a profile encryption server, a profile generation server, a profile provisioner (PP), a profile provider, a profile provisioning credentials holder (PPC holder), etc.

In the disclosure, a "profile management server" may include a function for managing a profile. The profile management server may be represented as subscription manager secure routing (SM-SR), subscription manager secure routing plus (SM-SR+), an off-card entity of an eUICC profile manager or a profile management credentials holder (PMC holder), an eUICC manager (EM), a profile manager (PM), etc.

In the disclosure, a profile providing server may mean that functions of a profile management server are merged. Accordingly, in various embodiments of the disclosure, an operation of a profile providing server may be performed in a profile management server. Likewise, an operation of a profile management server or SM-SR may be performed in a profile providing server.

In the disclosure, a "subscription relay server" may be represented as a subscription manager discovery service (SM-DS), a discovery service (DS), a root discovery relay server (root SM-DS), or an alternative subscription relay server (alternative SM-DS). The subscription relay server may receive an event registration request (or a register event request or an event register request) from one or more profile providing servers to subscription relay servers. Furthermore, one or more discovery relay servers may be complexly used. In this case, a first subscription relay server may receive an event registration request from a subscription discovery relay server in addition to a profile providing server.

A "mobile operator" may indicate a business that provides a device with a communication service, and may denote a business supporting system (BSS), operational supporting system (OSS), point of sale (POS) terminal, and other IT systems of a mobile operator. Furthermore, in the disclosure, the mobile operator is not limited to representing only one specific business that provides a communication service, and may be used as a term that denotes a group or association (or consortium) of one or more businesses or a representative that represents a corresponding group or association. Furthermore, in the disclosure, the mobile operator may be named an operator (OP) (or Op.), a mobile network operator (MNO), a mobile virtual network operator (MVNO), a service provider (SP), a profile owner (PO), etc. Each mobile operator may be assigned at least one name and/or object identifier (OID) of a mobile operator. If a mobile operator denotes a group or association or representative of one or more businesses, a name or object ID of a given group or association or representative may be a name or object ID shared by all businesses belonging to the corresponding group or association to all businesses cooperating with the corresponding representative.

A "subscriber" may be used as a term that denotes a service provider having ownership of a device or an end user having ownership of a device. In general, a device whose ownership is had by a service provider may be named an M2M device. A device whose ownership is had by an end user may be named a consumer device. In the case of the M2M device, an end user who does not have ownership of the device, but uses the device handed over or leased from a service provider may be present. In this case, a subscriber may be the same as or different from a service provider.

"End user consent" may be used as a term that denotes whether an end user gives consent to the execution of local management to remote management.

A "device" may be denoted as a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile or other terms. Various embodiments of the device may include a cellular telephone, a smartphone having a wireless communication function, a personal digital assistant (PDA) having a wireless communication function, a wireless modem, a portable computer having a wireless communication function, a photographing device such as a digital camera having a wireless communication function, a gaming device having a wireless communication function, music storage and playback home appliances having a wireless communication function, Internet home appliances capable of wireless Internet access and browsing, and also portable units or devices in which combinations of such functions are integrated. Furthermore, the device may include a machine to machine (M2M) device, a machine type communication (MTC) UE/device, but the disclosure is not limited thereto. In the disclosure, the device may be denoted as an electronic device.

In the disclosure, a UICC onto which a profile may be downloaded and installed may be embedded in an electronic device. If a UICC is not embedded in an electronic device, the UICC physically separated from the electronic device may be inserted into the electronic device and connected thereto. For example, the UICC may be inserted into the electronic device in a card form. The electronic device may include a device. In this case, the device may be a device including a UICC onto which a profile may be downloaded and installed. A UICC may be embedded in a device. Furthermore, if a device and a UICC are separated, the UICC may be inserted into the device and may be inserted into the device and connected thereto. A UICC onto which a profile may be downloaded and installed may be denoted as an eUICC, for example.

A "local profile assistant (LPA)" may be denoted as software or an application installed in a device or an electronic device in order to control a UICC or an eUICC in the device or the electronic device.

An "event" may be a term that collectively calls profile download, remote profile management, or a management/processing command for another profile or eUICC. An event may be named a remote SIM provisioning operation (or an RSP operation) or an event record. Each event may be denoted as data including one or more of a corresponding event identifier (ID) (or EventID) or matching ID (or MatchingID), an address (FQDN, IP Address, or URL) of a profile providing server (SM-DP+) or a discovery relay server (SM-DS) in which a corresponding event is stored, a signature of a profile providing server (SM-DP+) or a subscription relay server (SM-DS), or a digital certificate of a profile providing server (SM-DP+) or a subscription relay server (SM-DS).

Data corresponding to an event may be denoted as a "command code." Some of or the entire procedure using a command code may be denoted as a "command code processing procedure" or a "command code procedure" or a "local profile assistant application programming interface (LPAAPI)." Profile download may be interchangeably used with profile installation.

Furthermore, an "event type" may be used as a term indicating whether a specific event is profile download, remote profile management (e.g., delete, enable, disable, replace, or update) or another profile or eUICC management/processing command, and may be named an operation type (or OperationType), an operation class (or OperationClass), an event request type, an event class, an event request class, etc. A path along which a device has obtained a corresponding event ID (EventID or MatchingID) or a purpose of use (EventID source or MatchingID source) of the corresponding event ID (EventID or MatchingID) may be designated in a given event ID (EventID or MatchingID).

"Profile management" may be basically divided into "local profile management (LPM)" and "remote profile management (RPM)."

"LPM" may be named profile local management, local management, a local management command, a local command, a local profile management package (LPM package), a profile local management package, a local management package, a local management command package, a local command package, etc. LPM may be used to update a state (enabled, disabled, deleted) of a specific profile or the contents (e.g., a profile nickname or profile metadata) of a specific profile through software installed in a device, etc. LPM may include one or more local management commands. In this case, a profile that becomes a target of each local management command may be the same or different for each local management command.

"RPM" may be named profile remote management, remote management, a remote management command, a remote command, a remote profile management package (RPM package), a profile remote management package, a remote management package, a remote management command package, a remote command package, etc. RPM may be used to update a state (enabled, disabled, deleted) of a specific profile or the contents (e.g., a profile nickname, or profile metadata) of a specific profile. RPM may include one or more remote management commands. In this case, a profile that becomes a target of each remote management commands may be the same or different for each remote management command.

A "certificate" or a "digital certificate" may indicate a digital certificate used in mutual authentication based on an asymmetric key including a pair of a public key (PK) and a secret key (SK). Each certificate may include one or more PKs, a PK identifier (PKID) corresponding to each PK, an ID (certificate issuer ID) of a certificate issuer (CI) that has issued a corresponding certificate, and a digital signature. Furthermore, the certificate issuer may be named a certification issuer, a certificate authority (CA), a certification authority, etc. In the disclosure, a PK and a PKID may be used as a meaning that denotes a certificate including a specific PK to a corresponding PK, a part of a specific PK to a part of a certificate including a corresponding PK, a value of an operation result (e.g., hash) of a specific PK to an operation result (e.g., hash) of a certificate including a corresponding PK, a value of an operation result (e.g., hash) of some of a specific PK to an operation result (e.g., hash) of some of a certificate including a corresponding PK, a storage space in which data is stored, etc.

A "certificate chain" or a "certificate hierarchy" may indicate a correlation between corresponding certificates when certificates (primary certificate) issued by a "certificate issuer" are used to issue other certificates (secondary certificates) or secondary certificates are used to connectionally issue tertiary certificates or more. In this case, a CI certificate used to issue the first certificate may be named the root of a certificate, the highest certificate, a root CI, a root CI certificate, a root CA, a root CA certificate, etc.

Furthermore, in describing the disclosure, a detailed description of a related known function or configuration will be omitted if it is deemed to make the subject matter of the disclosure unnecessarily vague.

Hereinafter, various embodiments of a method and apparatus for transferring and installing bundles between devices are described.

FIG. 1 is a diagram illustrating a method of connecting, by a device using a UICC on which a fixed profile has been mounted, a mobile communication network according to an embodiment of the present disclosure.

As illustrated in FIG. 1, a UICC 120 may be inserted into a device 110. For example, the UICC 120 may be a detachable type or may be previously embedded in the device.

A fixed profile of a UICC on which the fixed profile has been mounted may mean that "access information" capable of accessing a specific communication company has been fixed. For example, the access information may be an international mobile subscriber identity (IMSI), that is, a subscriber discriminator, and a K or Ki value necessary for authentication for a network along with the subscriber discriminator.

The device 110 according to various embodiments may perform authentication along with an authentication processing system (e.g., a home location register (HLR) or AuC) of a mobile communication operator by using the UICC 120. For example, an authentication process may be an authentication and key agreement (AKA) process. When succeeding in the authentication, the device may use a mobile communication service, such as using a call or mobile data, over a mobile communication network 130 of a mobile communication system.

Figure 2:
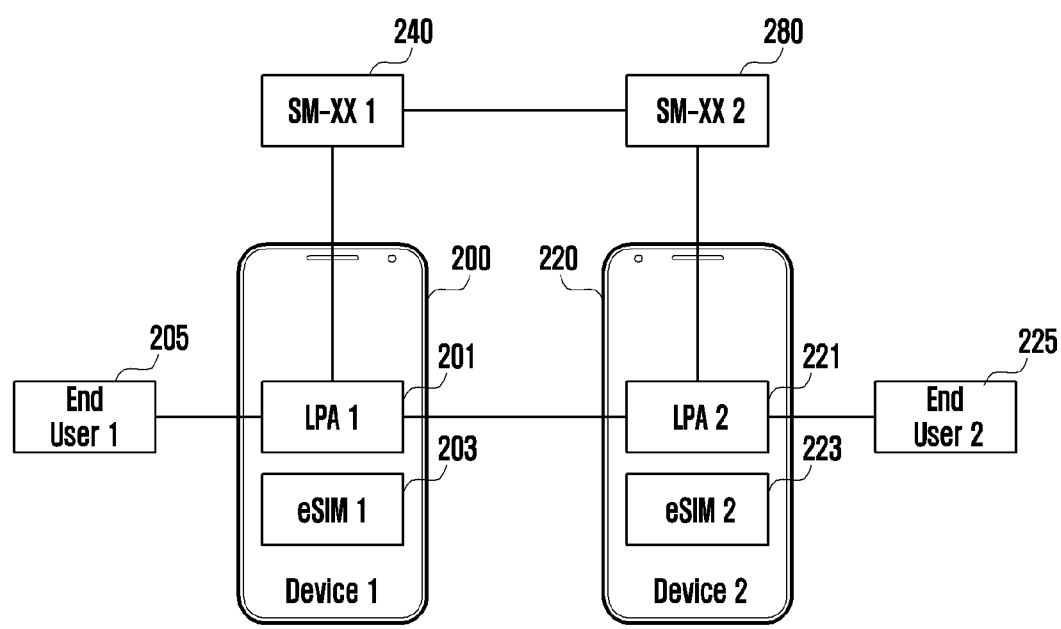
FIG. 2 is a diagram illustrating an example of a method of mutually operating, by two devices and a server, with respect to each other so that profile or a service associated with the profile can be transferred from one device to another device according to an embodiment of the present disclosure.

FIG. 2 is a diagram illustrating an example of a method of mutually operating, by two devices and a server, with respect to each other so that profile or a service associated with the profile can be transferred from one device to another device according to an embodiment of the present disclosure.

As illustrated in FIG. 2, a first eSIM 203 and a second eSIM 223 may be mounted on a first device 200 and a second device 220, respectively. Profiles (not illustrated) may be installed in the first eSIM 203 and the second eSIM 223, respectively. Furthermore, a first LPA 201 and a second LPA 221 may be installed in the first device 200 and the second device 220, respectively. The first eSIM 203 and the second eSIM 223 may be controlled by the first LPA 201 and the second LPA 221, respectively. A first end user 205 and a second end user 225 may control the profiles installed in the eSIMs (i.e., the first eSIM 203 and the second eSIM 223) of the devices through the first LPA 201 and the second LPA 221, respectively. In this case, the first end user 205 and the second end user 225 may be the same. Furthermore, the first LPA 201 and the second LPA 221 may be connected and communicate with each other. In this case, for a possible connection method between the LPAs, reference is made to a description of drawings to be described later.

The first LPA 201 of the first device 200 may be connected to a first RSP server 240. The second LPA 221 of the second device 220 may be connected to a second RSP server 280. In this case, the first RSP server 240 and the second RSP server 280 may be the same. Furthermore, FIG. 2 illustrates a case where the first RSP server 240 and the second RSP server 280 include single servers, respectively, for convenience sake. However, according to an implementation and an embodiment, one or more profile providing servers (SM-DP+) may be included in a server configuration. One or more subscription relay servers (SM-DS) for assisting the connection and generation of a specific profile providing server and a specific device may be included in a server configuration. Furthermore, although not illustrated in FIG. 2, one or more RSP servers and/or relay servers may be connected between the first RSP server 240 and the second RSP server 280.

Furthermore, although not illustrated in FIG. 2, each RSP server and/or each relay server may be connected to an operator server. If one or more operator servers are included in a configuration, each operator server may be connected to each separate RSP server and/or separate relay server. At least one operator server may be connected to the same RSP server and/or the same relay server.

As described above, a configuration of various servers may be simply indicated as a single RSP server in the following drawings. For example, if one or more RSP servers and/or relay servers are connected between the first device 200 and the second device 220 and some or all of the RSP servers and/or relay servers are connected to an operator server, a configuration of the various servers present between the first device and the second device may be represented as a single RSP server. The single RSP server may be denoted as SM-XX in drawings and embodiments.

Figure 3:
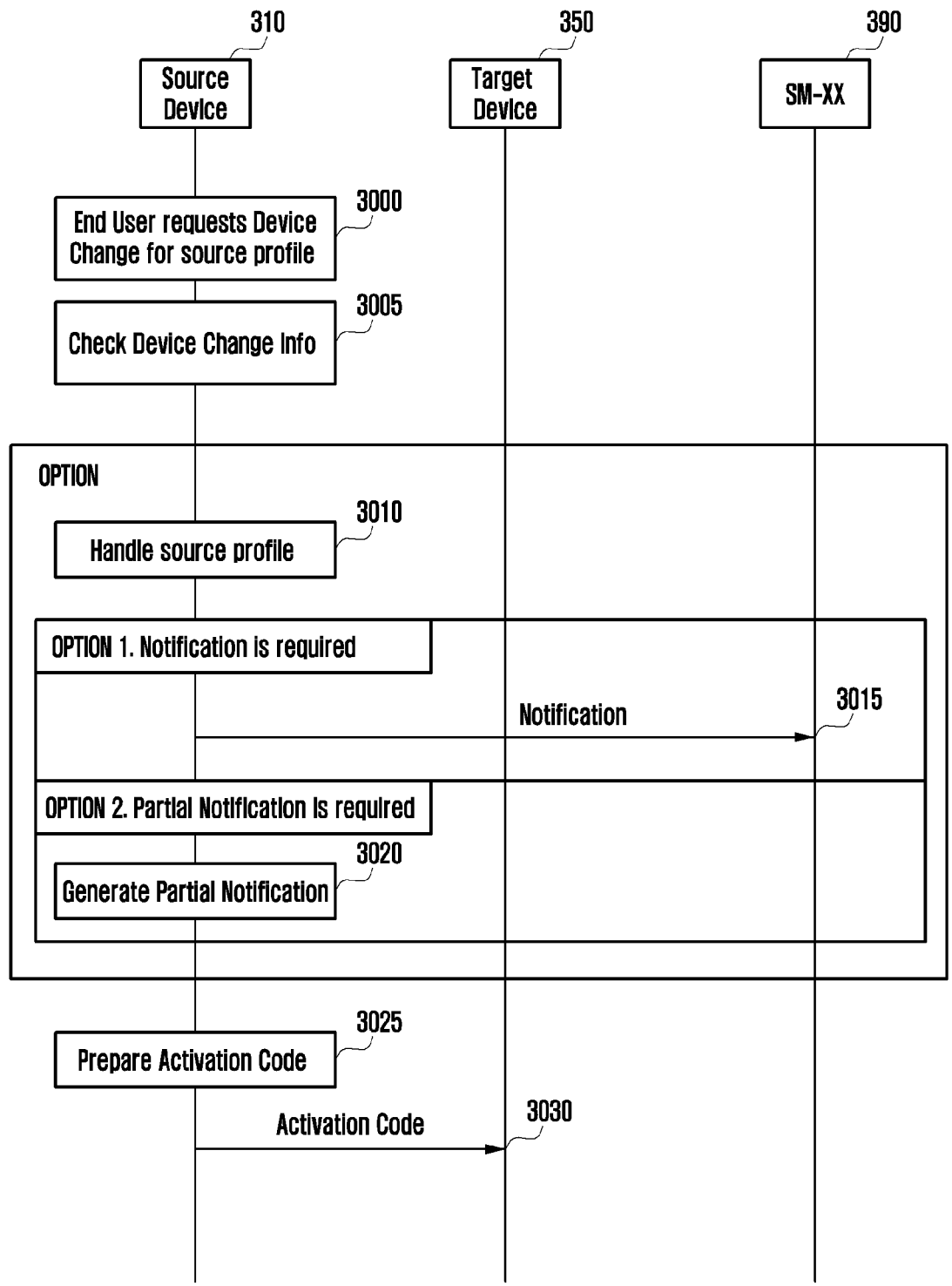
FIG. 3 is a diagram illustrating a first step procedure of a "device change of first version" according to an embodiment of the present disclosure.

FIG. 3 is a diagram illustrating a first step procedure of a "device change of first version" according to an embodiment of the present disclosure.

Each of a source device 310 and a target device 350 illustrated in FIG. 3 may include at least one LPA and at least one eSIM. For a description of an RSP server 390, reference is made to FIG. 2.

According to various embodiments, the source device 310 may own a previously installed profile.

According to various embodiments, the source device 310 may own "device change information (device change info)" related to the previously installed profile. The "device change information" may be configured by a mobile operator and stored in the device before a device change is made. The process may be performed when the source device installs a corresponding profile.

The "device change information" may include the following information. The following information is merely an example, and the disclosure is not limited thereto.

In one example, a device change is not supported for a corresponding profile.

In one example, a device change is supported for a corresponding profile. In this case, in order to obtain the "device change method," first, a remote process needs to be performed.

In one example, a device change is supported for a corresponding profile. The "device change method" is included in device change information. In this case, a device change may be performed through a local process without performing a remote process.

If a corresponding profile has been configured to experience a "remote process," the following information may be further included in the "device change information." The following information is merely an example, and the disclosure is not limited thereto.

In one example, an address of a server to be accessed in order to obtain the device change method is provided.

In one example, whether an eUICC ID of a target device needs to be presented when accessing a server in order to obtain the device change method.

In one example, whether a target device that wants to take over a service when accessing a server in order to obtain the device change method needs to present information necessary to perform an eligibility check by which the target device can download and install a corresponding profile.

The "device change method (or a device change type)," that is, information which is previously stored in device change information or may be obtained through the "remote process," may include the following information.

In one example, information on how profile installed in the source device may be processed. The information may indicate any one of the followings:

Delete a corresponding profile;

Set a state of a corresponding profile as a suspended state; or

Special processing is not performed on a corresponding profile.

In one example, "Information on how an RSP server needs to be notified of a corresponding result when a source device deletes a profile or sets a state of the profile as the suspended state." The information may indicate any one of the followings:

The source device needs to directly notify the RSP server of the corresponding result; or The source device notifies the RSP server of the corresponding result through the target device.

Referring to FIG. 3, in step 3000, a service subscriber or a device user may select a source profile associated with a service to be transferred to the target device among communication services now used in the device (i.e., the source device 310). In this case, the source device may provide the service subscriber or the device user with necessary information in relation to a device change.

Referring to FIG. 3, in step 3005, the source device 310 may identify "device change information" of a profile associated with the service to be transferred by the end user.

If the "device change information" indicates that a device change is not supported for the corresponding profile, a device change process may be suspended.

Alternatively, if the "device change information" indicates that a device change is supported for the corresponding profile, but a remote process needs to be first performed in order to obtain a "device change method," the source device 310 may access the RSP server 390, may obtain the "device change method," and may then identify information included in the "device change method."

Alternatively, if the "device change information" indicates that a device change is supported for the corresponding profile and the "device change method" is included in the device change information, the source device 310 may identify information included in the device change method.

Referring to FIG. 3, in step 3010, the following process may be performed.

If the corresponding profile has been configured to be deleted in "information on how a profile installed in a source device may be processed" of the "device change method," the source device 310 may delete the corresponding profile.

Alternatively, if the corresponding profile has been configured to have its state set as the suspended state in the "information on how a profile installed in a source device may be processed" of the "device change method," the source device 310 may change a state of the corresponding profile into the suspended state.

Alternatively, if special processing has been configured to be not performed on the corresponding profile in the "information on how a profile installed in a source device may be processed" of the "device change method," steps 3010 to 3020 may be omitted.

Steps 3015 to 3020 to be described later may be performed if the corresponding profile has been configured to be deleted or to have its state set as the suspended state in the "information on how a profile installed in a source device may be processed" of the "device change method."

Referring to FIG. 3, in step 3015, the following process may be performed. Specially, step 3015 may be performed if "a source device needs to directly notify an RSP server of a corresponding result" has been configured in "information on how an RSP server needs to be notified of a corresponding result when a source device deletes a profile or sets a state of the profile as the suspended state" of the "device change method"

In step 3015, the source device 310 may notify the RSP server 390 that it has deleted the corresponding profile or has set a state of the corresponding profile as the suspended state. The process may be performed by transmitting, by the source device 310, notification to the RSP server 390. The "notification" may include at least one of the following information. The following information is merely an example, and the disclosure is not limited thereto.

In one example, a notification sequence number is provided.

In one example, information meaning that the source device has deleted the profile or has set a state of the profile as the suspended state is provided.

In one example, an address of the RSP server at which the notification may be received.

In one example, a profile discriminator of a profile that has been deleted or has its state set as the suspended state is provided.

In one example, a value of a signature electronically signed by the source device (e.g., an eUICC mounted on the source device) in some of and/or the entire information is provided.

In one example, a series of certificate information for verifying the value of the electronic signature is provided.

Referring to FIG. 3, in step 3020, the following process may be performed. Specially, step 3020 may be performed if "a source device needs to notify an RSP server of a corresponding result through a target device" has been configured in "information on how an RSP server needs to be notified of a corresponding result when a source device deletes a profile or sets a state of the profile as the suspended state" of the "device change method."

In step 3020, the source device 310 may generate partial notification evidencing that the source device has deleted the corresponding profile or has set a state of the corresponding profile as the suspended state. The "partial notification may include one or more of the following information. The following information is merely an example, and the disclosure is not limited thereto.

In one example, a notification sequence number is provided.

In one example, information meaning that the source device has deleted the profile or has set a state of the profile as the suspended state is provided.

In one example, an address of the RSP server at which the notification may be received is provided.

In one example, a profile discriminator of the profile that has been deleted or has its state set as the suspended state is provided.

In one example, a value of a signature electronically signed by the source device (e.g., an eUICC mounted on the source device) in some of and/or the entire information is provided.

That is, the partial notification may be a series of information other than a series of certificate information for verifying the value of the electronic signature in the aforementioned notification.

Referring to FIG. 3, in step 3025, the source device 310 may prepare an activation code to be transmitted to the target device 350. In this case, a method of preparing the activation code may be performed as follows in various ways, as configured in "information on how a profile installed in a source device may be processed" and "information on how an RSP server needs to be notified of a corresponding result when a source device deletes a profile or sets a state of the profile as the suspended state" included in the "device change method."

If "special processing is not performed on a corresponding profile" has been configured in the "information on how a profile installed in a source device may be processed" included in the "device change method," the activation code to be transmitted to the target device may be included as a part of the "device change method." In this case, the source device may extract the activation code included in the "device change method," and may be prepared to transmit the activation code to the target device.

Alternatively, if a corresponding profile has been configured to be deleted or to have its state set as the suspended state in the "information on how a profile installed in a source device may be processed" included in the "device change method" and "a source device needs to directly notify an RSP server of a corresponding result" has been configured in the "information on how an RSP server needs to be notified of a corresponding result when a source device deletes a profile or sets a state of the profile as the suspended state," the activation code to be transmitted to the target device may be included as a part of the "device change method." In this case, the source device may extract the activation code included in the "device change method," and may be prepared to transmit the activation code to the target device.

Alternatively, if a corresponding profile has been configured to be deleted or to have its state set as the suspended state in the "information on how a profile installed in a source device may be processed" included in the "device change method" and "a source device needs to notify an RSP server of a corresponding result through a target device" has been configured in the "information on how an RSP server needs to be notified of a corresponding result when a source device deletes a profile or sets a state of the profile as the suspended state," the source device may generate the activation code by including, in the activation code, the partial notification generated in step 3020.

The activation code may include one or more of the following information. The following information is merely an example, and the disclosure is not limited thereto:

Information denoting a format of the activation code;

Information (e.g., an address and/or an OID) of an RSP server required to be accessed by a target device in order to download a profile; and/or Information indicating a profile to be downloaded by a target device. When the RSP server receives the information, the information may mean information capable of recognizing a corresponding profile. For example, the information may denote at least one of the followings.

In one example, a profile discriminator (ICCID) of a profile to be downloaded is provided. For example, if an activation code has been generated by a source device, the information may be included in the activation code.

In one example, a matching ID connected to a profile to be downloaded is provided. The matching ID may be generated by an RSP server, may be connected to a corresponding profile and may be managed by the RSP server. For example, if an activation code is included in a "device change method" and extracted by a source device, the information may be included in the activation code.

Furthermore, if step 3020 has been performed, the activation code may further include the following information.

In one example, partial notification, for example, if an activation code has been generated by a source device, the information may be included in the activation code.

Referring to FIG. 3, in step 3030, the source device 310 may transmit, to the target device 350, the activation code prepared in step 3025. The activation code may be transmitted through one of various methods suggested below. The methods are merely examples, and the disclosure is not limited thereto.

For example, the source device 310 may provide an end user with information to be transmitted to the target device 350 through a user interface (UI) of the source device. The end user may input the provided information by using the UI of the target device.

Alternatively, the source device 310 may make information to be delivered to the target device 350 in the form of an image (e.g., a QR code), and may display the image on a screen of the source device. The end user may scan the image displayed on the screen of the source device by using the target device, so that the information may be transmitted to the target device.

Alternatively, a connection may be established between the source device 310 and the target device 350. The information may be transmitted using the established connection. In this case, the connection established between the source device 310 and the target device 350 may be a direct device-to-device connection (e.g., a wireless connection, such as NFC, Bluetooth, UWB, WiFi-Direct, LTE device-to-device (D2D), or 5G D2D, and a wired connection, such as a cable connection), or may be a remote distance connection in which a remote server (e.g., a relay server) is disposed between the source device 310 and the target device 350.

Figure 4:
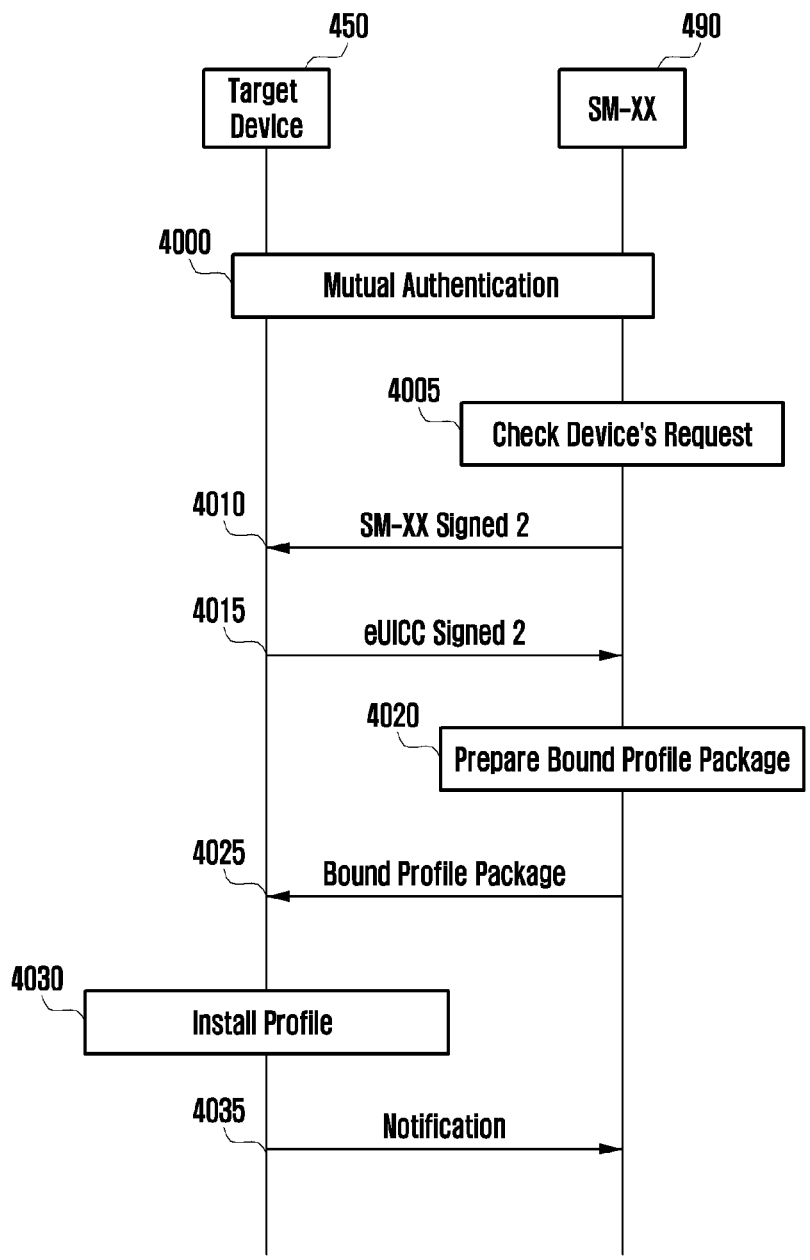
FIG. 4 is a diagram illustrating a second step procedure of the "device change of first version" according to an embodiment of the present disclosure.

FIG. 4 is a diagram illustrating a second step procedure of the "device change of first version" according to an embodiment of the present disclosure.

A target device 450 illustrated in FIG. 4 may include at least one LPA and at least one eSIM. For a description of an RSP server 490, reference is made to FIG. 2.

Referring to FIG. 4, in step 4000, mutual authentication may be performed between the target device 450 and the RSP server 490. Such a mutual authentication process may include one or more of the following processes.

In one example, the mutual authentication process may include a certificate negotiation process that needs to be performed between the target device 450 and the RSP server 490 for communication. For example, the target device 450 may transmit, to the RSP server 490, certificate information which may be used to verify the RSP server 490 and/or certificate information which may be used for the RSP server 490 to verify the target device. The RSP server 490 that has received the information may select the certificate information that may be used for the target device 450 to verify the RSP server and/or the certificate information that may be used for the RSP server to verify the target device 450. In this case, the certificate information selected by the RSP server 490 may be transmitted to the target device 450. Through such a process, the target device 450 and the RSP server 490 may obtain certificate information on which the target device 450 and the RSP server 490 can authenticate each other. In this case, the certificate information may be a certificate and/or information included in a certificate and/or a series of information capable of denoting a certificate.

In one example, the target device 450 may transmit, to the RSP server 490, a given random number (eUICC Challenge) value generated by the target device. After writing an electronic signature in the received random number value, the RSP server 490 may transmit a value of the electronic signature to the target device 450. The target device 450 may authenticate the RSP server by verifying the received value of the electronic signature.

In one example, the RSP server 490 may transmit, to the target device 450, a given random number (server Challenge) value generated by the RSP server. After writing an electronic signature in the received random number value, the target device 450 may transmit a value of the electronic signature to the RSP server 490. The RSP server 490 may authenticate the target device 450 by verifying the received value of the electronic signature.

In one example, while the RSP server 490 and the target device 450 communicate with each other, IDs (transaction IDs) for managing a session may be exchanged. For example, after generating a transaction ID, the RSP server 490 may transmit a value of the transaction ID to the target device 450. In this case, in order to check the reliability and integrity of the transaction ID, a value of the electronic signature of the RSP server 490 may be added.

In one example, the RSP server 490 and the target device 450 may exchange information capable of denoting a profile associated with a service to be transferred in the disclosure. For example, the target device 450 may transmit, to the RSP server 490, information capable of denoting a profile associated with a service to be received by the target device. In this case, the "information capable of indicating a profile associated with a service to be received by itself" transmitted from the target device 450 to the RSP server 490 may be information which is included in the activation code received from the source device in step 3030 of FIG. 3 or generated based on information of the received activation code. That is, the "information capable of indicating a profile associated with a service to be received by itself" transmitted from the target device 450 to the RSP server 490 may be information (e.g., an ICCID of a corresponding profile or a matching ID associated with a corresponding profile) included in:

i) an activation code owned by the source device and included in a "device change method," which has been extracted and transmitted by the source device or ii) an activation code autonomously generated and transmitted by the source device and/or information (e.g., when an ICCID is transmitted, a specific text string, for example, $ may be placed ahead of the ICCID) generated using the information. In this case, the "information capable of indicating a profile associated with a service to be received by itself" transmitted from the target device 450 to the RSP server 490 may be transmitted along with a value of the electronic signature of the target device 450 in order to guarantee reliability and integrity.

In one example, if "partial notification" is included in an activation code received by the target device 450 from a source device, the target device 450 may deliver the received partial notification to the RSP server 490.

In one example, the RSP server 490 and the target device 450 may exchange their IDs. For example, the RSP server 490 may provide the target device 450 with its own object identifier (OID). For another example, the target device 450 may provide the RSP server 490 with its own eUICC ID.

Referring to FIG. 4, in step 4005, the RSP server 490 may perform at least one of the following processes.

In one example, the RSP server 490 may identify a profile whose transmission has been requested by the target device 450 by using the "information capable of indicating a profile associated with a service to be received by itself" transmitted by the target device 450.

In one example, the RSP server 490 may identify whether a corresponding profile is a profile capable of a device change by checking "device change information" of the corresponding profile.

In on example, the RSP server 490 may identify that a corresponding profile is a profile that allows a device change through which method by checking a "device change method" of the corresponding profile.

In one example, the RSP server 490 may identify whether "notification" related to a corresponding profile has arrived (e.g., the notification received in step 3015).

In one example, the RSP server 490 may identify the contents of "partial notification" when receiving the "partial notification" in relation to a corresponding profile.

In one example, the RSP server 490 may perform an "eligibility check" in order to identify whether a service desired to be received by the target device 450 may be used in the target device 450.

Referring to FIG. 4, in step 4010, the RSP server 490 may transmit one or more of the following information to the target device 450. The following information is merely an example, and the disclosure is not limited thereto:

A transaction ID;
Meta data of a profile desired to be received by the target device;
A value of the electronic signature of some of and/or the entire data; and/or
A certificate of the RSP server and related information used in the electronic signature.
A series of information transmitted from the RSP server 490 to the target device 450 may be called "SM-XX Signed 2."

Referring to FIG. 4, in step 4015, the following process may be performed.

The target device 450 may receive user consent in relation to profile installation. In this process, an end user may be provided with the content of the received meta data.

The target device 450 may verify the validity of the certificate and related information received in step 4010. Furthermore, the target device 450 may verify the validity of a value of the electronic signature received in step 4010.

The target device 450 may generate a public key "otPK.EUICC.KA" and a secret key "otSK.EUICC.KA," that is, a key pair for encryption to be used to produce an encryption key for encryption communication with the RSP server 490.

The target device 450 may transmit one or more of the following information to the RSP server 490. The following information is merely an example, and the disclosure is not limited thereto:

A transaction ID;
otPK.EUICC.KA; and/or
A value of the electronic signature of the target device (e.g., an eUICC included in the target device) for some of and/or the entire data.
The series of information transmitted from the target device 450 to the RSP server 490 may be called "eUICC Signed 2."

Referring to FIG. 4, in step 4020, the RSP server 490 may prepare a profile to be transmitted to the target device 450. A possible example of the preparation process is as follows.

In step 4000, if the target device 450 has transmitted information by using information included in "an activation code owned by a source device and included in a "device change method," which has been extracted and transmitted by the source device," when transmitting, to the RSP server 490, "information capable of indicating a profile associated with a service to be received by itself" and has not transmitted notification from the source device, the RSP server 490 may prepare to transmit, to the target device 450, a new profile which is associated with a service used by the source device, but is different from a profile owned by the source device.

In step 4000, if the target device 450 has transmitted information by using information included in an "activation code owned by a source device and included in a "device change method," which has been extracted and transmitted by the source device," when transmitting, to the RSP server 490, "information capable of indicating a profile associated with a service to be received by itself," and notification has been transmitted from the source device to the RSP server 490 in step 3015 of FIG. 3, the RSP server 490 may prepare to transmit, to the target device 450, a profile having the same information as a profile used by the source device.

In step 4000, if the target device 450 has transmitted information by using information included in an "activation code generated and transmitted by a source device" when transmitting, to the RSP server 490, "information capable of indicating a profile associated with a service to be received by itself," and partial notification has also been transmitted from the target device 450 to the RSP server 490, the RSP server 490 may prepare to transmit, to the target device 450, a profile having the same information as a profile used by the source device.

Some of and/or the entire prepared profile may be encrypted for encryption communication of the RSP server 490 and the target device 450. In this case, in order to generate an encryption key for the encryption communication of the RSP server 490 and the target device 450, in step 4015, otPK.EUICC.KA transmitted from the target device 450 to the RSP server 490 may be used. The profile some and/or the entire of which has been encrypted using the generated encryption key may be denoted as a "bound profile package."

Referring to FIG. 4, in step 4025, the RSP server 490 may transmit, to the target device 450, the "bound profile package" prepared in step 4020.

Referring to FIG. 4, in step 4030, the target device 450 may install the profile by using the "bound profile package" received in step 4025.

Referring to FIG. 4, in step 4035, the target device 450 may notify the RSP server 490 that the profile has been installed.

Figure 5:
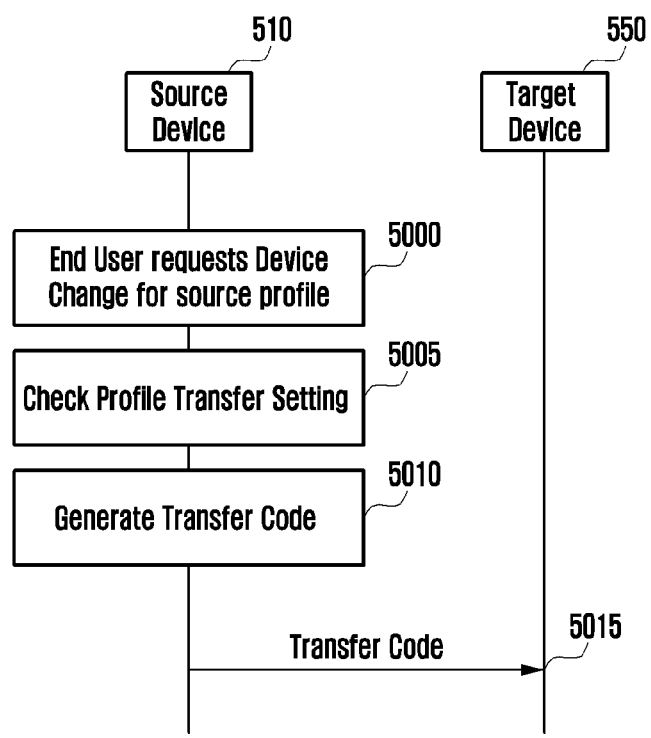
FIG. 5 is a diagram illustrating a first step procedure of a "device change of second version" according to an embodiment of the present disclosure.

FIG. 5 is a diagram illustrating a first step procedure of a "device change of second version" according to an embodiment of the present disclosure.

Each of a source device 510 and a target device 550 illustrated in FIG. 5 may include at least one LPA and at least one eSIM.

A method of transferring (or exporting), from a source device to a target device, a profile or a service associated with the profile through the "device change of second version" disclosed in FIGS. 5 to 8 may be denoted as an online transfer. The online transfer is defined as follows.

Online transfer: the transfer of a profile or a service associated with the profile through an online method may mean that each of two devices and an RSP server establish a connection and a profile or a service associated with the profile is transferred with the help of the RSP server.

In this case, the online transfer may be classified as follows. The following classification is merely an example, and the disclosure is not limited thereto:

Online image transfer: this may mean that a profile image is transmitted from one device to another device through an online transfer;

Online package transfer: this may mean that a profile package is transmitted from one device to another device through an online transfer; and/or Re-provisioning: this means a process in which each of two devices and an RSP server establish a connection, a profile of a device in which the profile has been originally installed is selectively deleted, and the RSP server prepares a profile associated with a service to be transferred and transmits the prepared profile to another device.

The "online image transfer" and the "online package transfer" may be denoted as "online transfer."

If the contents are arranged, the following methods may be classified.

In one example, online transfer is provided.

In such example, online transfer may comprise:

Online image transfer; and/or

Online package transfer.

In such example, re-provisioning is provided.

According to various embodiments, the source device 510 may own a previously installed profile, and may further own meta data associated with the previously installed profile. According to various embodiments, the source device 510 may own a "profile discriminator" related to the previously installed profile.

According to various embodiments, the source device 510 may own "profile transfer setting" related to a previously installed profile. The "profile transfer setting" may include the following information. The following information is merely an example, and the disclosure is not limited thereto:

Whether a corresponding profile or a service associated with the profile may be transferred from one device to another device.

Furthermore, the "profile transfer setting" may include information indicating how a corresponding profile or a service associated with the profile can be transferred if the corresponding profile or the service associated with the profile can be transferred from one device to another device.

For example, the "profile transfer setting" may include information on which method(s) of the following methods is permitted:

Online transfer; and/or

Re-provisioning.

For another example, the "profile transfer setting" may include information on which method(s) of the following methods is permitted:

Online image transfer;

Online package transfer; and/or

Re-provisioning.

Referring to FIG. 5, in step 5000, the source device 510 may obtain information of a profile (associated with a service) to be transferred. Alternatively, information of a profile (associated with a service) to be transferred may be delivered to a source device.

For example, the source device 510 may obtain information of a profile (associated with a service) to be transferred by receiving a user input of an end user who selects the profile through a UI provided by the source device 510. Information of a profile (associated with a service) to be transferred may be inputted to the source device 510 through a push input from a remote server or the source device 510 may access a remote server and read information of a profile (associated with a service) to be transferred.

A method of obtaining, by the source device 510, information of a profile (associated with a service) to be transferred is not limited to the aforementioned methods. The source device 510 may obtain information of a profile (associated with a service) to be transferred based on various methods.

Referring to FIG. 5, in step 5005, the following process may be performed.

The source device 510 may identify "profile transfer setting of the profile whose information is obtained in step 5000. The source device 510 may identify whether a corresponding profile or a service associated with the profile may be transferred to another device by identifying the "profile transfer setting." The source device 510 may identify how a corresponding profile or a service associated with the profile may be transferred by identifying the "profile transfer setting," and may then configure an "available option."

For example, the "available option" may include information on which method(s) of the following methods is permitted:

Online transfer; and/or

Re-provisioning.

For another example, the "available option" may include information on which method(s) of the following methods is permitted:

Online image transfer;

Online package transfer; and/or

Re-provisioning.

In this case, in order to configure the "available option," one or more of the following information may be used. The following information is merely an example, and the disclosure is not limited thereto:

"Profile transfer setting" of a profile (associated with a service) to be transferred;

A function (i.e., a device function supports a transfer using which method) implemented in a source device; and/or An online connection state of a source device (e.g., whether a source device can now communicate with a server through an online connection).

That is, a source device may identify a "transfer method permitted in profile transfer setting" and/or a "transfer method supportable because the method has been implemented in the source device" and/or a "possible transfer method when an online connection state of the source device is considered," and may then configure the "available option" by using the information.

Referring to FIG. 5, in step 5010, the source device 510 may generate a "transfer code." The transfer code may include one or more of the following information. The following information is merely an example, and the disclosure is not limited thereto:

A "profile discriminator" of a profile (associated with a service) to be transferred;

An address of an RSP server related to a profile (associated with a service) to be transferred (Thereafter, the target device 550 may access an RSP server by using the address and download the profile); and/or Information (Supported Crypto Info) of encryption algorithms supported by the source device (e.g., an eSIM included in the source device). For example, the information of encryption algorithms supported by the source device may selectively include one or more of the following information; an elliptic curve list supported by the source device, an algorithm list of key sums supported by the source device, or an encryption algorithm list supported by the source device:

The "available option" generated in step 5005.

Referring to FIG. 5, in step 5015, the following process may be performed.

The transfer code generated in step 5010 may be transmitted from the source device 510 to the target device 550. A method of transmitting the transfer code may be various as follows. The following method is merely an example, and the disclosure is not limited thereto.

For example, the source device 510 may provide an end user with information to be transmitted to the target device 550 through a UI of the source device. The end user may input the provided information to the target device 550 by using a UI of the target device 550.

Alternatively, the source device 510 may make information to be delivered to the target device 550 in the form of an image (e.g., a QR code), and may display the information on a screen of the source device 510. An end user may scan the image displayed on the screen of the source device by using the target device 550, so that the information may be transmitted to the target device 550.

Alternatively, a connection may be established between the source device 510 and the target device 550. Information may be transmitted from the source device 510 to the target device 550 by using the established connection. In this case, the connection established between the source device 510 and the target device 550 may be a direct device-to-device connection (e.g., a wireless connection, such as NFC, Bluetooth, UWB, WiFi-Direct, LTE device-to-device (D2D), or 5G D2D, and a wired connection, such as a cable connection) or may be a remote distance connection in which a remote server (e.g., a relay server) is disposed between the source device 510 and the target device 550.

If an "available option" is included in the transfer code received by the target device 550, the target device 550 may configure a "determined option," that is, information indicating how a profile to be received by the target device or a service associated with the profile may be received based on such information.

For example, the "determined option" may include information on which method(s) of the following methods is permitted:

Online transfer; and/or

Re-provisioning.

For another example, the "determined option" may include information on which method(s) of the following methods is permitted:

Online image transfer;

Online package transfer; and/or

Re-provisioning.

In this case, in order to configure the "determined option," one or more of the following information may be used. The following information is merely an example, and the disclosure is not limited thereto:

The "available option" received in step 5015;

A function (i.e., a device function supports a transfer using which method) implemented in the target device; and/or An online connection state of the target device (e.g., whether the target device can now communicate with a server through an online connection).

That is, the target device may identify a "transfer method permitted in the received "available option" and/or a "transfer method supportable because the method has been implemented in the target device" and/or a "possible transfer method when an online connection state of the target device is considered," and may then configure the "determined option" by using such information.

Figure 6:
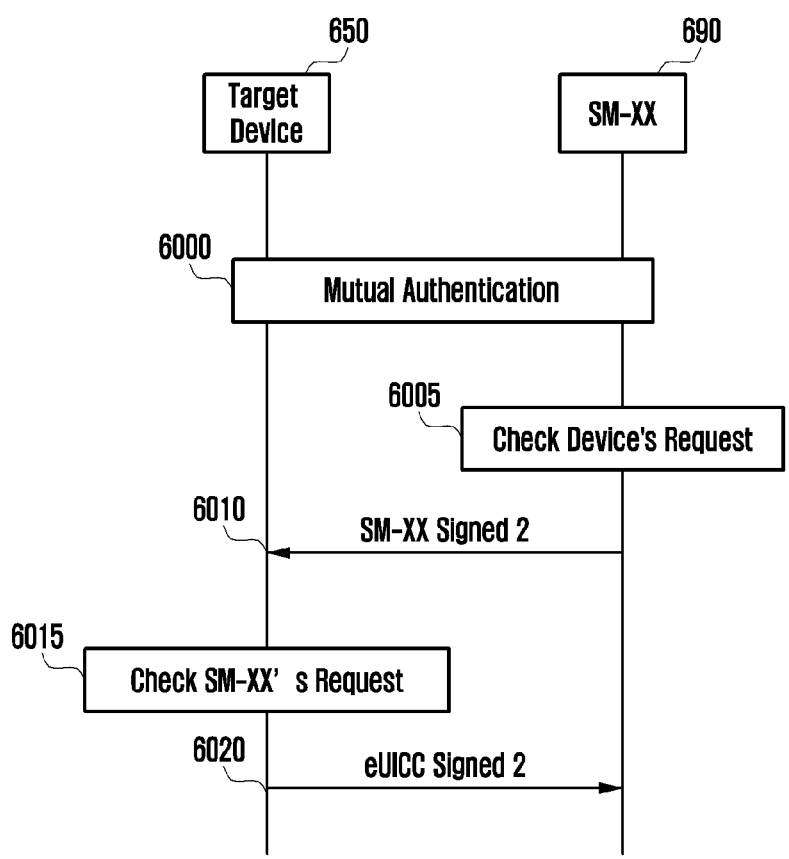
FIG. 6 is a diagram illustrating a second step procedure of the "device change of second version" according to an embodiment of the present disclosure.

FIG. 6 is a diagram illustrating a second step procedure of the "device change of second version" according to an embodiment of the present disclosure.

A target device 650 illustrated in FIG. 6 may include at least one LPA and at least one eSIM. For a description of an RSP server 690, reference is made to FIG. 2.

Referring to FIG. 6, in step 6000, mutual authentication may be performed between the target device 650 and the RSP server 690. Such a mutual authentication process may include one or more of the following processes.

In one example, the mutual authentication process may include a certificate negotiation process that needs to be performed between the target device 650 and the RSP server 690 in order to communicate with each other. For example, the target device 650 may transmit, to the RSP server 690, certificate information which may be used to verify the RSP server 690 and/or certificate information which may be used for the RSP server 690 to verify the target device 650. The RSP server 690 that has received the information may select the certificate information that may be used for the target device 650 to verify the RSP server 690 and/or the certificate information that may be used for the RSP server 690 to verify the target device 650. In this case, the certificate information selected by the RSP server 690 may be transmitted to the target device 650. Through such a process, the target device and the RSP server 690 may obtain certificate information capable of authenticating each other. In this case, the certificate information may be a certificate and/or information included in a certificate and/or a series of information capable of indicating a certificate.

In one example, the target device 650 may transmit, to the RSP server 690, a given random number (eUICC Challenge) value generated by the target device. After writing an electronic signature in the received random number value, the RSP server 690 may transmit a value of the electronic signature to the target device 650. The target device 650 may authenticate the RSP server 690 by verifying the received value of the electronic signature.

In one example, the RSP server 690 may transmit, to the target device 650, a given random number (server Challenge) value generated by the RSP server. After writing an electronic signature in the received random number value, the target device 650 may transmit a value of the electronic signature to the RSP server 690. The RSP server 690 may authenticate the target device 650 by verifying the received value of the electronic signature.

In one example, while the RSP server 690 and the target device 650 communicate with each other, IDs (transaction IDs) for managing a session may be exchanged. For example, after generating a transaction ID, the RSP server 690 may transmit a value of the transaction ID to the target device 650. In this case, in order to check the reliability and integrity of the transaction ID, a value of the electronic signature of the RSP server 690 may be added.

In one example, the RSP server 690 and the target device 650 may exchange profile discriminators of a profile associated with a service to be transferred in the disclosure. For example, the target device 650 may transmit, to the RSP server 690, a profile discriminator of a profile associated with a service to be received by the target device. In this case, the profile discriminator may be transmitted along with a value of the electronic signature of the target device 650 in order to guarantee reliability and integrity.

In one example, the RSP server 690 and the target device 650 may exchange their IDs. For example, the RSP server 690 may provide the target device 650 with its own object identifier (OID). For another example, the target device 650 may provide the RSP server 690 with its own eUICC ID.

In one example, the target device 650 may transmit the "determined option" to the RSP server 690.

Referring to FIG. 6, in step 6005, the following process may be performed.

The RSP server 690 may identify the received "determined option." In particular, the RSP server may select "profile transfer setting" associated with a corresponding profile by identifying the received profile discriminator, and may check whether online transfer methods included in the "determined option" are methods included in online transfer methods permitted in the "profile transfer setting."

The RSP server 690 may perform an "eligibility check" in order to identify whether a service desired to be received by the target device 650 may be used in the target device 650. For example, the RSP server 690 may perform the "eligibility check" by using the eUICC ID of the received target device 650 and the received profile discriminator.

For example, the RSP server 690 may check whether an image of a profile used in a source device can be installed and operate in the target device 650. For another example, the RSP server 690 may check whether a profile package stored in a source device can be installed and operate in the target device 650. Furthermore, the RSP server 690 may newly generate a profile which may be installed and operate in the target device 650 in relation to a service to be transferred, or may identify whether the profile has been previously stored.

In other words, the RSP server 690 may identify an option(s) which may be actually executed (i.e., a service used in a source device is transferred to the target device 650 as a result of the execution) during an online transfer method included in the "determined option." The RSP server 690 may select one of available options and generate a transfer option.

For example, the "transfer option" may include at least one of the following information. The following information is merely an example, and the disclosure is not limited thereto:
a) Information indicating the RSP server 690 (e.g., an OID of the RSP server 690);
b) Information indicating the target device 650 (e.g., an eUICC ID of an eSIM installed in the target device 650);
c) A profile discriminator of a profile associated with a service to be transferred;
d) Information indicating how an online transfer may be performed; In this instance, followings may be provided:
  Online image transfer,
  Online package transfer,
  Re-provisioning, and/or
  An online transfer is not possible;
e) Information indicating which one of "end-to-end encryption between a source device and a target device" and "encryption between a target device and an RSP server" may be used; and/or
f) A transaction ID.

Some of and/or the entire aforementioned information may be electronically signed by the RSP server 690. A value of the electronic signature may be included as a part of the "transfer option."

Referring to FIG. 6, in step 6010, the RSP server 690 may transmit the transfer option to the target device 650. Furthermore, the RSP server 690 may transmit, to the target device 650, a certificate of the RSP server and related information used in the electronic signature performed in step 6005. A series of information transmitted from the RSP server 690 to the target device 650 may be denoted as "SM-XX signed 2."

Referring to FIG. 6, in step 6015, the following process may be performed.

The target device 650 may identify the received transfer option and then receive consent from an end user.

The target device 650 may verify the validity of the certificate received in step 6010 and related information. The target device 650 may verify the validity of a value of the electronic signature received in step 6010. The target device 650 may identify the contents of the transfer option received in step 6010.

If "end-to-end encryption between a source device and a target device" needs to be performed, the target device 650 may identify the contents of "Supported Crypto Info" received from a source device, and may identify whether an encryption algorithm supported by the target device is present in the "Supported Crypto Info." When encryption algorithms supported by the target device 650 are present in the received Supported Crypto Info, the target device 650 may select one of the encryption algorithms and configure the selected encryption algorithms as a "selected encryption algorithm (Selected Crypto Info)." The "selected encryption algorithm" may selectively include one or more of the following information: elliptic curve information, algorithm information of a key sum, or encryption algorithm information.

The target device 650 may generate a public key "otPK.EUICC.KA" and a secret key "otSK.EUICC.KA," that is, a key pair for encryption to be used to generate an encryption key for encryption communication. In this case, the generated encryption key may be for "encryption communication between an RSP server and a target device," and may be for "encryption communication between a source device and a target device." In this case, if the generated encryption key is for "encryption communication between a source device and a target device," the encryption keys (otPK.EUICC.KA and otSK.EUICC.KA) may be encryption keys that follow the encryption algorithm included in the aforementioned Selected Crypto Info.

Referring to FIG. 6, in step 6020, the target device 650 may transmit at least one of the following information to the RSP server 690. The following information is merely an example, and the disclosure is not limited thereto:

otPK.EUICC.KA. generated in step 6015;

The selected Crypto Info generated in step 6015; and/or

Signature information electronically signed by the target device 650 with respect to some of and/or the entire information.

The information transmitted from the target device 650 to the RSP server 690 may be denoted as "eUICC Signed 2."

Figure 7:
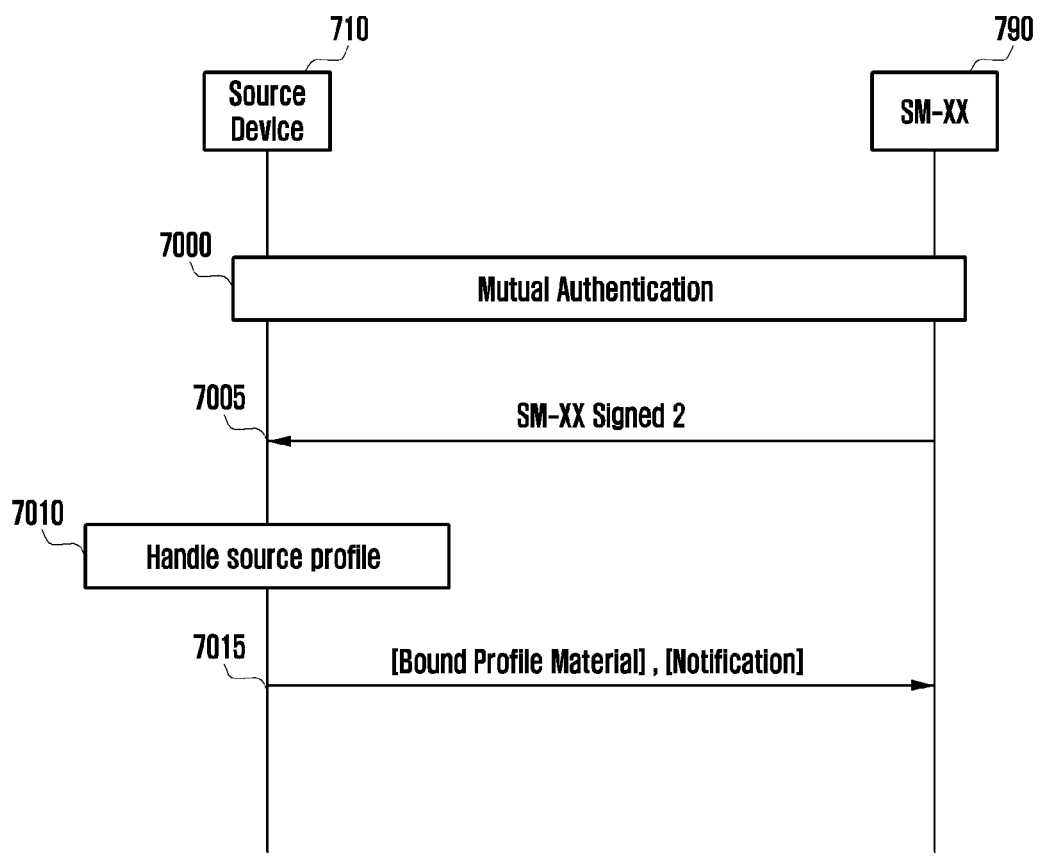
FIG. 7 is a diagram illustrating a third step procedure of the "device change of second version" according to an embodiment of the present disclosure.

FIG. 7 is a diagram illustrating a third step procedure of the "device change of second version" according to an embodiment of the present disclosure.

A source device 710 illustrated in FIG. 7 may include at least one LPA and at least one eSIM. For a description of an RSP server 790, reference is made to FIG. 2.

Referring to FIG. 7, in step 7000, mutual authentication may be performed between the source device 710 and the RSP server 790. Such a mutual authentication process may include one or more of the following processes.

In one example, the mutual authentication process may include a certificate negotiation process that needs to be performed between the source device 710 and the RSP server 790 in order to communicate with each other. For example, the source device 710 may transmit, to the RSP server 790, certificate information which may be used to verify the RSP server 790 and/or certificate information which may be used for the RSP server 790 to verify the source device 710. The RSP server 790 that has received the information may select the certificate information that may be used for the source device 710 to verify the RSP server 790 and/or the certificate information that may be used for the RSP server 790 to verify the source device 710. In this case, the certificate information selected by the RSP server 790 may be transmitted to the source device 710. Through such a process, the source device 710 and the RSP server 790 may obtain certificate information capable of authenticating each other. In this case, the certificate information may be a certificate and/or information included in a certificate and/or a series of information capable of denoting a certificate.

In one example, the source device 710 may transmit, to the RSP server 790, a given random number (eUICC Challenge) value generated by the source device 710. The RSP server 790 may write an electronic signature in the received random number value and then transmit a value of the electronic signature to the source device 710. The source device 710 may authenticate the RSP server 790 by verifying the received value of the electronic signature.

In one example, the RSP server 790 may transmit, to the source device 710, a given random number (server Challenge) value generated by the RSP server. The source device 710 may write an electronic signature in the received random number value and then transmit a value of the electronic signature to the RSP server 790. The RSP server 790 may authenticate the source device 710 by verifying the received value of the electronic signature.

In one example, while the RSP server 790 and the source device 710 communicate with each other, IDs (transaction IDs) for managing a session may be exchanged. For example, after generating a transaction ID, the RSP server 790 may transmit a value of the transaction ID to the source device 710. In this case, in order to check the reliability and integrity of the transaction ID, a value of the electronic signature of the RSP server 790 may be added.

In one example, the RSP server 790 and the source device 710 may exchange profile discriminators of a profile (associated with a service) to be transferred to a target device in the disclosure. For example, the source device 710 may transmit a profile discriminator of a corresponding profile to the RSP server 790. In this case, the profile discriminator may be transmitted along with a value of the electronic signature of the source device 710 in order to guarantee reliability and integrity.

In one example, the RSP server 790 and the source device 710 may exchange their IDs. For example, the RSP server 790 may provide the source device 710 with its own object identifier (OID). For another example, the source device 710 may provide the RSP server 790 with its own eUICC ID.

Referring to FIG. 7, in step 7005, the following process may be performed.

In one example, the RSP server 790 may perform one or more of the following processes.

In one example, the RSP server 790 may identify that the source device 710 is a legitimate subject that now uses the corresponding profile by using the "eUICC ID of the source device" and a "profile discriminator of a profile transmitted by the source device."

In one example, the RSP server may check whether another device (e.g., the target device illustrated in FIG. 6) has already requested the transfer of the "service associated with the profile corresponding to the profile discriminator transmitted by the source device." For example, the RSP server 790 may identify whether the "the profile discriminator transmitted by the source device" is a profile discriminator associated with the transfer of the service requested in FIG. 6.

As a result of the check, if it has been identified that the "legitimate subject that uses the profile associated with the profile discriminator transmitted by the source device is the source device" and the transfer of the service associated with the profile has been requested by the another device (e.g., the target device illustrated in FIG. 6), the RSP server may determine what operation needs to be performed by the source device by using the results of the "determined option" received in step 6000 and/or the "eligibility check" performed in step 6005, and may generate a "transfer option." For example, the RSP server may select one of transfer methods which have been permitted in the "determined option" and may be performed as the results of the "eligibility check," and may configure the "transfer option" based on the selected method.

For example, the "transfer option" may include at least one of the following information. The following information is merely an example, and the disclosure is not limited thereto.

In one example, information (e.g., an OID of the RSP server 790) indicating the RSP server 790 is provided.

In one example, information (e.g., an eUICC ID of an eSIM embedded in the source device 710) indicating that the source device 710 is provided.

In one example, information (e.g., an eUICC ID of an eSIM embedded in the target device 650) indicating the target device 650.

In one example, a profile discriminator of a profile associated with a service to be transferred.

In one example, information indicating information that needs to be transmitted by the source device 710

In such example, a profile image associated with the service to be transferred by the source device 710 is provided.

In such example, a profile package associated with the service to be transferred by the source device 710.

In one example, whether the source device 710 needs to delete a service profile associated with the service to be transferred.

In one example, information indicating which security method among "end-to-end encryption between a source device and a target device" and "encryption between a source device and an RSP server" needs to be used.

In one example, a transaction ID.

Some of and/or the entire aforementioned information may be electronically signed by the RSP server 790. A value of the electronic signature may be included as a part of the "transfer option."

The RSP server 790 may generate a public key "otPK.DP.KA" and a secret key "otSK.DP.KA," that is, a key pair for encryption to be used to generate an encryption key for encryption communication with the source device 710. If "end-to-end encryption between a source device and a target device" is necessary, such a process may be omitted.

The RSP server 790 may transmit one or more of the following information to the source device 710. The following information is merely an example, and the disclosure is not limited thereto:

A transfer option;

otPK.XX.KA. In this case, otPK.XX.KA may be otPK.EUICC.KA received from the target device in step 6020 or may be otPK.DP.KA generated by the RSP server in the process;

Selected Crypto Info received in step 6020;

A value of the electronic signature signed by the RSP server with respect to some of and/or the entire information; and/or A certificate of the RSP server and related information which may be used to verify the electronic signature.

Referring to FIG. 7, in step 7010, the following process may be performed.

The source device 710 may receiver user consent in relation to the received transfer option. That is, the source device may notify an end user whether a transfer using which method may be performed based on the received transfer option, and may receive consent from the end user.

The source device 710 may verify the validity of the certificate received in step 7005 and related information. The source device 710 may verify the validity of the value of the electronic signature received in step 7005.

After identifying the contents of the transfer option received in step 7005, the source device 710 may perform at least one of the following processes.

The source device 710 may identify whether it is necessary to autonomously transmit the profile image or the profile package to the RSP server 790 by using the "transfer option."

If it is necessary to transmit the profile image or the profile package to the RSP server 790, the source device 710 may prepare requested data, and a detailed procedure thereof is as follows.

The source device 710 may identify information included in the selected Crypto Info. For example, if "end-to-end encryption between a source device and a target device" needs to be performed, the source device may identify this face and identify information included in the selected Crypto Info.

The source device 710 may generate a public key "otPK.EUICC.KA" and a secret key "otSK.EUICC.KA," that is, a key pair for encryption to be used to generate an encryption key for encryption communication. In this case, the generated encryption key may be for "encryption communication between an RSP server and a source device" and may be for "encryption communication between a source device and a target device." For which encryption communication is the generated encryption key may be determined based on a value of otPK.XX.KA received in step 7005. Alternatively, for which encryption communication is the generated encryption key may follow the contents of the "transfer option." The source device 710 may calculate a value of the electronic signature of the generated otPK.EUICC.KA. The otPK.EUICC.KA and/or the value of the electronic signature may be denoted as "eUICC Signed 2."

In one example, the source device 710 may generate a session key to be used for encryption communication by using the "otSK.EUICC.KA" generated by the source device and otPK.XX.KA received in step 7005.

In one example, the source device 710 may prepare a profile to be transmitted to the RSP server 790. In this case, a form of the prepared profile may be matched with the transfer option received in step 7005. That is, a form of the prepared profile may be one of the followings:

A profile image; or

A profile package.

In one example, some of and/or the entire prepared profile may be encrypted by the aforementioned session key. Furthermore, some of and/or the entire prepared profile may be electronically signed by the source device 710. A value of the electronic signature may be included as a part of the prepared profile. The "prepared profile image" or the "prepared profile package" may be called a "bound profile material."

The source device 710 may check whether the RSP server 790 wants to delete the corresponding profile by identifying the "transfer option." If the RSP server 790 wants to delete the corresponding profile, the source device 710 may delete the corresponding profile.

Referring to FIG. 7, in step 7015, the following process may be performed.

The source device 710 may transmit corresponding information when information to be transmitted to the RSP server 790 is present among the following information. However, when information to be transmitted is not present, this process may be omitted. The following information is merely an example, and the disclosure is not limited thereto:

Notification providing notification that a profile has been deleted;

Abound profile material; and/or eUICC Signed 2.

The RSP server 790 may verify the validity of the received notification and/or the eUICC Signed 2. This process may be performed by verifying the validity of the notification and/or the value of the electronic signature of the source device included in the eUICC Signed 2.

Figure 8:
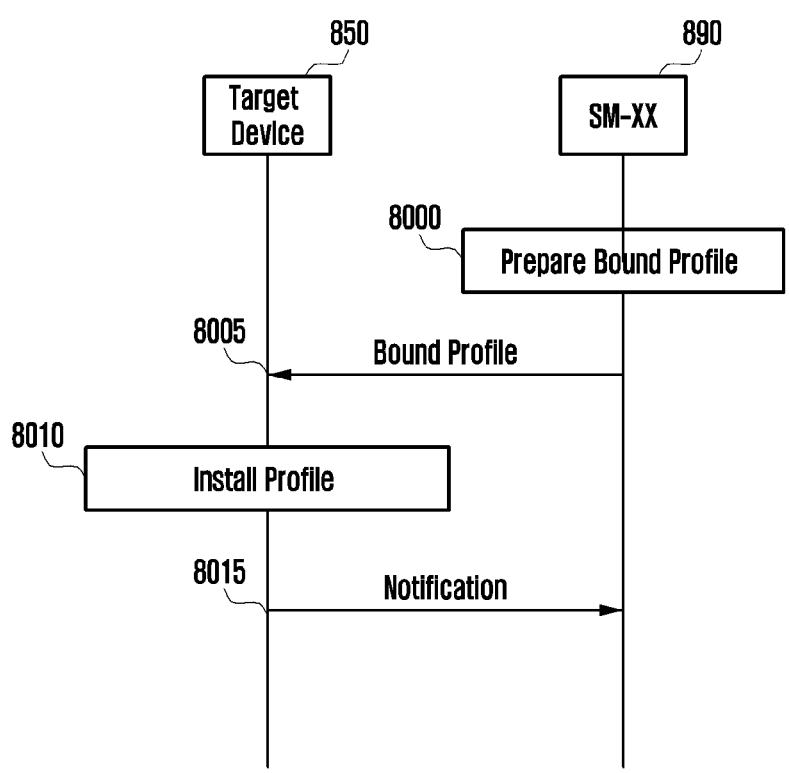
FIG. 8 is a diagram illustrating a fourth step procedure of the "device change of second version" according to an embodiment of the present disclosure.

FIG. 8 is a diagram illustrating a fourth step procedure of the "device change of second version" according to an embodiment of the present disclosure.

A target device 850 illustrated in FIG. 8 may include at least one LPA and at least one eSIM. For a description of an RSP server 890, reference is made to FIG. 2.

Referring to FIG. 8, in step 8000, the following process may be performed.

The RSP server 890 may prepare a profile to be transmitted to the target device 850. A possible example of the preparation process is as follows.

If a bound profile material has not been received from the source device 710 in step 7015, the following process may be performed. Such a case may correspond to a case where re-provisioning among the online transfer methods is required.

In one example, the RSP server 890 may prepare the profile to be transmitted to the target device 850. In this case, the profile to be transmitted to the target device 850 may be generated by the RSP server 890 or a previously stored profile may be used as the profile to be transmitted to the target device 850. In this case, the prepared profile may be the same as a profile used by a source device or may be a profile which is associated with a service used by a source device, but is different from a profile used by the source device (e.g., providing the same service). For example, if a profile used by a source device has been deleted, the RSP server may prepare the same profile as the profile used by the source device. For another example, if a profile used by a source device has not been deleted, the RSP server may prepare a profile different from the profile used by the source device. Whether a profile used by a source device has been deleted does not determine which profile (i.e., whether a profile is the same profile or different profile) needs to be prepared. Such selection may depend on the selection of a mobile operator or the RSP server 890.

In one example, the RSP server 890 may generate a public key "otPK.DP.KA" and a secret key "otSK.DP.KA," that is, a key pair to be used to generate an encryption key for "encryption communication between a target device and an RSP server." The RSP server 890 may generate a session key by using the generated otSK.DP.KA and otPK.EUICC.KA of the target device 850 received in step 6020, and may encrypt some of and/or the entire prepared profile by using the session key.

In one example, the prepared (or additionally encrypted) profile may be denoted as a "bound profile."

If a bound profile material has been received from the source device 710 in step 7015, the following process may be performed. This case may correspond to a case where online transfer (i.e., online image transfer or online package transfer) among the online transfer methods is required.

In one example, if the RSP server 890 has received a "bound profile material" having "encryption between a source device and an RSP server" performed in step 7015, the RSP server 890 performs decoding. In this case, the decoding may be performed by using the session key generated using otSK.DP.KA generated in step 7005 and otPK.EUICC.KA of the source device received in step 7015. The decoded profile may experience an "encryption between a target device and an RSP server" process so that the decoded profile is transmitted to the target device. The RSP server 890 may generate a public key "otPK.DP.KA" and a secret key "otSK.DP.KA," that is, a key pair to be used to generate an encryption key for "encryption communication between a target device and an RSP server." The RSP server 890 may generate a session key by using the generated otSK.DP.KA and otPK.EUICC.KA of the target device 850 received in step 6020, may encrypt the decoded profile by using this key, and may prepare to transmit the profile.

In one example, if the RSP server has received a "bound profile material" having "encryption between a source device and a target device" performed in step 7015, the RSP server may prepare to transmit the bound profile material to the target device 850 without a need to specially perform decoding and encryption processes again.

In one example, the profile prepared as a result of the two processes may be denoted as a "bound profile."

Referring to FIG. 8, in step 8005, the RSP server 890 may transmit the "bound profile" to the target device 850.

Referring to FIG. 8, in step 8010, the following process may be performed.

The target device 850 may verify the received "bound profile." For example, the target device 850 may identify and verify the contents of meta data included in the "bound profile." Furthermore, the target device 850 may receive user consent regarding whether the "bound profile" may be installed.

The target device 850 may install the profile (in an eSIM embedded in the target device 850) by using the received "bound profile."

Referring to FIG. 8, in step 8015, the target device 850 may notify the RSP server 890 that the profile has been installed.

Figure 9:
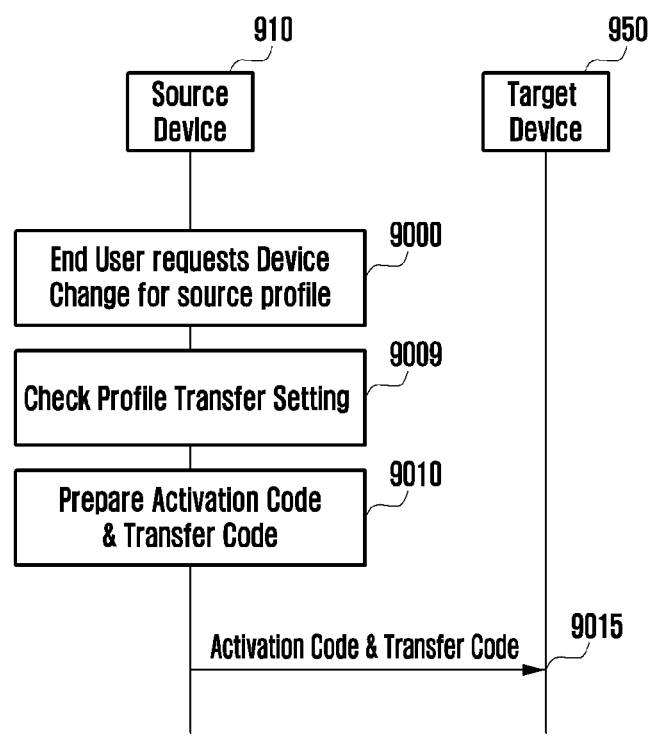
FIG. 9 is a diagram illustrating a first step of a process of attempting, by a source device performing an operation of the "device change of second version," a device change on a target device performing the "device change of second version" or a target device performing the "device change of first version" according to an embodiment of the present disclosure.

FIG. 9 is a diagram illustrating a first step of a process of attempting, by a source device performing an operation of the "device change of second version," a device change on a target device performing the "device change of second version" or a target device performing the "device change of first version" according to an embodiment of the disclosure.

Each of a source device 910 and a target device 950 illustrated in FIG. 9 may include at least one LPA and at least one eSIM. The source device 910 may be a terminal operating according to a "device change second version." The target device 950 may be a terminal operating according to the "device change second version" or may be a terminal operating according to the "device change first version."

According to various embodiments, the source device 910 may own a previously installed profile, and may further own meta data associated with the previously installed profile. According to various embodiments, the source device 910 may own a "profile discriminator" related to the previously installed profile. According to various embodiments, the source device 910 may own "profile transfer setting" related to the previously installed profile. For a description of the "profile transfer setting," reference is made to FIG. 5.

Referring to FIG. 9, in step 9000, the source device 910 may obtain information of a profile (associated with a service) to be transferred. Alternatively, information of a profile (associated with a service) to be transferred may be delivered to the source device 910.

For example, the source device 910 may obtain information of a profile (associated with a service) to be transferred by receiving a user input of an end user who selects the profile through a UI provided by the source device 910. Information of a profile (associated with a service) to be transferred may be inputted to the source device 910 through a push input from a remote server or the source device 910 may access a remote server and read information of a profile (associated with a service) to be transferred.

A method of obtaining, by the source device 910, the information of the profile (associated with the service) to be transferred is not limited to the aforementioned methods. The source device 910 may obtain information of a profile (associated with a service) to be transferred based on various methods.

Referring to FIG. 9, in step 9005, the following process may be performed.

The source device 910 may identify the "profile transfer setting" of the profile whose information has been obtained in step 9000. The source device may identify whether a corresponding profile or a service associated with the profile can be transferred to another device by identifying the "profile transfer setting." The source device 910 may identify how a corresponding profile or a service associated with the profile may be transferred by identifying the "profile transfer setting," and may configure an "available option." For a description of the available option, reference is made to FIG. 5.

Referring to FIG. 9, in step 9010, the source device 910 may generate a "combined code" to be transmitted to the target device 950. Detailed contents of the "combined code" are as follows.

In one embodiment, a code which may be a basis to generate the combined code is provided.

The source device may use the following two codes in order to configure the combined code:

An activation code; and/or
A transfer code.

In one example, an activation code is provided.

The activation code may have the same format as the activation code used in the "device change of first version" in FIG. 3. That is, the activation code may include some and/or all of the following information. The following information is merely an example, and the disclosure is not limited thereto:

Information indicating a format of the activation code;
Information (e.g., an address and/or an OID) of an RSP server that needs to be accessed by the target device 950 in order to download a profile;
Information indicating a profile to be downloaded by the target device 950. The information may mean information on which a corresponding profile can be recognized when the RSP server receives the information. For example, the information may denote at least one of the followings:
  A profile discriminator (ICCID) of a profile to be downloaded, and
  A matching ID connected to a profile to be downloaded;
Partial notification.

The aforementioned matching ID may be an ID generated by a mobile operator and/or an RSP server, associated with a corresponding profile, and managed by the RSP server. For example, a mobile operator may generate a matching ID in order to support a device change from a terminal operating according to the "device change of second version" to a terminal operating according to the "device change of first version," and may provide the information to the device (e.g., a source device) operating according to the "device change of second version."

The aforementioned partial notification may have the same format as the partial notification disclosed in FIG. 3, but may not have the same format as the partial notification disclosed in FIG. 3. The partial notification may be a series of data inserted in order to follow a format of an activation code used in the "device change of first version" without recording a corresponding history after actually deleting a corresponding profile (unlike in the case of FIG. 3). That is, the series of data may be a given value or may be a value agreed between a source device and an RSP server.

Some examples of a possible activation code may be as follows.

In one example, the possible activation code may include the following information. The activation code may include additional information in addition to the following information, if necessary. The following information is merely an example, and the disclosure is not limited thereto:
  Information indicating a format of the activation code;
  Information (e.g., an address and/or an OID) of an RSP server required to be accessed by a target device in order to download a profile; and/or
  Matching ID.

In one example, the possible activation code may include the following information. The activation code may include additional information in addition to the following information, if necessary. The following information is merely an example, and the disclosure is not limited thereto:
  Information denoting a format of the activation code;
  Information (e.g., an address and/or an OID) of an RSP server required to be accessed by a target device in order to download a profile;
  ICCID; and/or
  Partial notification.

In one example, a transfer code is provided.

The transfer code may have the same format as the transfer code used in the "device change of second version" in FIG. 5. That is, the transfer code may include some and/or all of the following information. The following information is merely an example, and the disclosure is not limited thereto:
  A "profile discriminator" of a profile (associated with a service) to be transferred;
  An address of an RSP server related to a profile (associated with a service) to be transferred; and/or
  Information (Supported Crypto Info) of encryption algorithms supported by the source device (e.g., an eSIM included in the source device). For example, the information of the encryption algorithms supported by the source device may selectively include one or more of the following information; an elliptic curve list supported by the source device, an algorithm list of key sums supported by the source device, an encryption algorithm list supported by the source device.

In one example, an "available option" is provided.

In such example, a method of configuring a combined code is provided.

The source device 910 may generate the "combined code" to be transmitted to the target device 950 by using the "activation code" and the "transfer code" described in (1). In this case, the "combined code" may be a code in which the "activation code" and the "transfer code" are simply combined or may be a code newly generated by combining the contents of the "activation code" and the "transfer code."

Examples of the "combined code" may be as follows:
  An activation code+a transfer code (e.g., this may mean a code to which the transfer code is added after the activation code); and/or
  Some of an activation code+a transfer code (e.g., this may mean a code to which the remaining information is added after the activation code after contents already included in the activation code among the contents of the transfer code are excluded).

However, a method of configuring the "combined code" by using the "activation code" and the "transfer code" is not limited to the examples. A given combination capable of restoring an "activation code" and a "transfer code" by using a "combined code" may be permitted.

Referring to FIG. 9, in step 9015, the following process may be performed.

The "combined code" generated in step 9010 may be transmitted from the source device 910 to the target device 950. In order to transmit the "combined code," the method of transmitting the "transfer code" illustrated in step 50154 of FIG. 5 may be used.

If a target device is a terminal operating according to the "device change of second version," after a "transfer code" is restored from a received "combined code," a device change may be performed according to an operation defined in the "device change of second version." In this case, both all of a source device, the target device, and an RSP server may perform a device change according to the operation defined in the "device change second version." For a description of a corresponding process, reference is made to FIGS. 5 to 8.

Figure 10:
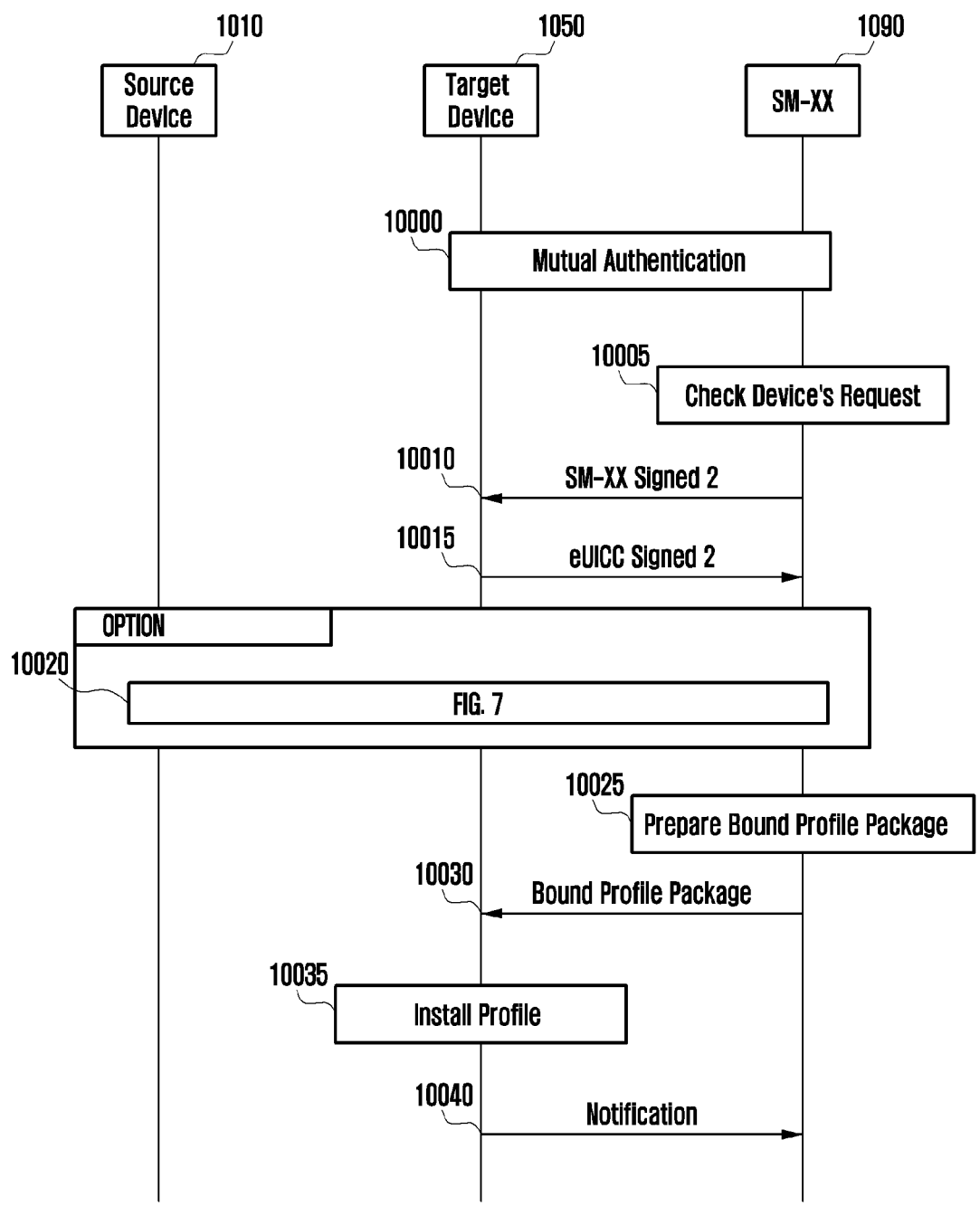
FIG. 10 is a diagram illustrating a second step of a process of attempting, by a source device performing an operation of the "device change of second version," a device change on a target device performing the "device change of first version" according to an embodiment of the present disclosure.

If a target device is a terminal operating according to the "device change of first version," after an "activation code" is restored from a received "combined code," a process of FIG. 10 may be performed. That is, a source device, the target device, and an RSP server may perform a device change according to an operation disclosed in FIG. 10.

FIG. 10 is a diagram illustrating a second step of a process of attempting, by a source device performing an operation of the "device change of second version," a device change on a target device performing the "device change of first version" according to an embodiment of the present disclosure.

Each of a source device 1010 and a target device 1050 illustrated in FIG. 10 may include at least one LPA and at least one eSIM. The source device 1010 may be a terminal operating according to the "device change of second version." The target device 1050 may be a terminal operating according to the "device change of first version." For a description of an RSP server 1090, reference is made to FIG. 2.

Referring to FIG. 10, in step 10000, mutual authentication may be performed between the target device 1050 and the RSP server 1090. Such a mutual authentication process may include one or more of the following processes.

In one example, the mutual authentication process may include a certificate negotiation process that needs to be performed between the target device 1050 and the RSP server 1090 in order to communicate with each other. For example, the target device 1050 may transmit, to the RSP server 1090, certificate information which may be used to verify the RSP server 1090 and/or certificate information which may be used for the RSP server 1090 to verify the target device 1050. The RSP server 1090 that has received the information may select the certificate information that may be used for the target device 1050 to verify the RSP server 1090 and/or the certificate information that may be used for the RSP server to verify the target device 1050. In this case, the certificate information selected by the RSP server 1090 may be transmitted to the target device 1050. Through such a process, the target device 1050 and the RSP server 1090 may obtain certificate information on which the target device 1050 and the RSP server 1090 can authenticate each other. In this case, the certificate information may be a certificate and/or information included in a certificate and/or a series of may be information capable of denoting a certificate.

In one example, the target device 1050 may transmit, to the RSP server 1090, a given random number (eUICC Challenge) value generated by the target device. After writing an electronic signature in the received random number value, the RSP server 1090 may transmit a value of the electronic signature to the target device 1050. The target device 1050 may authenticate the RSP server 1090 by verifying the received value of the electronic signature.

In one example, the RSP server 1090 may transmit, to the target device 1050, a given random number (server Challenge) value generated by the RSP server. After writing an electronic signature in the received random number value, the target device 1050 may transmit a value of the electronic signature to the RSP server 1090. The RSP server 1090 may authenticate the target device 1050 by verifying the received value of the electronic signature.

In one example, while the RSP server 1090 and the target device 1050 communicate with each other, IDs (transaction IDs) for managing a session may be exchanged. For example, after generating a transaction ID, the RSP server 1090 may transmit a value of the transaction ID to the target device 1050. In this case, in order to check the reliability and integrity of the transaction ID, a value of the electronic signature of the RSP server 1090 may be added.

In one example, the RSP server 1090 and the target device 1050 may exchange information capable of indicating a profile associated with a service to be transferred in the disclosure. For example, the target device 1050 may transmit, to the RSP server 1090, information capable of indicating a profile associated with a service to be received by the target device. In this case, the "information capable of indicating a profile associated with a service to be received by itself" transmitted from the target device 1050 to the RSP server 1090 may be information included in the "combined code" received from the source device in step 9015 of FIG. 9 or the "activation code" included in the "combined code." That is, the "information capable of indicating a profile associated with a service to be received by itself" transmitted from the target device 1050 to the RSP server 1090 may be:

i) an ICCID of a corresponding profile or information (e.g., when an ICCIC is transmitted, a specific text string, for example, $ may be inserted ahead of the ICCIC) generated using the ICCID of the corresponding profile; or ii) a matching ID associated with a corresponding profile, which is included in the "activation code." In this case, the "information capable of indicating a profile associated with a service to be received by itself" transmitted from the target device 1050 to the RSP server may be transmitted along with a value of the electronic signature of the target device 1050 in order to guarantee reliability and integrity.

In one example, if "partial notification" is included in the activation code received by the target device 1050 from the source device 1010, the target device 1050 may deliver the received partial notification to the RSP server 1090.

In one example, the RSP server 1090 and the target device 1050 may exchange their IDs. For example, the RSP server 1090 may provide its own object identifier (OID) to the target device 1050. For another example, the target device 1050 may provide its own eUICC ID to the RSP server 1090.

Referring to FIG. 10, in step 10005, the RSP server 1090 may perform at least one of the following processes.

In one example, the RSP server 1090 may identify the profile whose transmission has been requested by the target device 1050 by using the "information capable of indicating a profile associated with a service to be received by itself" transmitted by the target device 1050 and/or (the presence or absence of) the partial notification.

In one example, at least one of the following information may be identified based on the identified profile. The following information is merely an example, and the disclosure is not limited thereto:

(i) information of a device used by a corresponding profile. For example, the information may be information indicating that a source device is a terminal operating according to the "device change of second version"; and/or (ii) information of a device that wants to use a corresponding profile. For example, the information may be information indicating that a target device is a terminal operating according to the "device change of first version."

In one example, whether a corresponding profile is a profile that allows a device change may be identified.

In one example, an "eligibility check" may be performed in order to identify whether a service that the target device 1050 wants to receive may be used in the target device 1050.

Referring to FIG. 10, in step 10010, the RSP server 1090 may transmit one or more of the following information to the target device 1050. The following information is merely an example, and the disclosure is not limited thereto:

A transaction ID;
Meta data of a profile that the target device 1050 wants to receive;
A value of an electronic signature for some of and/or the entire data; and/or
A certificate of the RSP server 1090 and related information used in the electronic signature.

A series of information transmitted from the RSP server 1090 to the target device 1050 may be called "SM-XX Signed 2."

Referring to FIG. 10, in step 10015, the following process may be performed.

The target device 1050 may receive user consent in relation to profile installation. In this process, an end user may be provided with the contents of the received meta data.

The target device 1050 may verify the validity of the certificate received in step 10010 and related information. Furthermore, the target device 1050 may verify the validity of a value of the electronic signature received in step 10010.

The target device 1050 may generate a public key "otPK.EUICC.KA" and a secret key "otSK.EUICC.KA," that is, a key pair for encryption to be used to generate an encryption key for encryption communication with the RSP server 1090.

The target device 1050 may transmit one or more of the following information to the RSP server 1090. The following information is merely an example, and the disclosure is not limited thereto:

A transaction ID;
otPK.EUICC.KA; and/or
A value of the electronic signature of the target device (e.g., an eUICC included in the target device 1050) for some of and/or the entire data.

A series of information transmitted from the target device 1050 to the RSP server 1090 may be called "eUICC Signed 2."

Referring to FIG. 10, in step 10020, the following process may be performed. Step 10020 may be selectively performed when it is necessary for the source device to delete a profile associated with the present device change process.

In order for the source device 1010 to delete a corresponding profile, the processes disclosed in FIG. 7 may be performed between the source device 1010 and the RSP server 1090. In this case, only "processes necessary to delete a profile installed in the source device" among the processes disclosed in FIG. 7 may be selectively performed. That is, the following processes may be performed.

In step 7000, the process of authenticating, by the source device and the RSP server, each other.

In step 7005, the process of requesting, by the RSP server, the source device to delete a profile.

In step 7010, the process of deleting, by the source device, the profile.

In step 7015, the process of notifying, by the source device, the RSP server of the deletion of the profile.

However, in order to delete a corresponding profile, the source device does not need to essentially perform the processes of FIG. 7. A given process having the same effect (e.g., the source device 1010 deletes a corresponding profile and/or the RSP server 1090 identifies that a corresponding profile has been deleted in the source device 1010) may be performed.

Furthermore, the process of deleting a corresponding profile in the source device 1010 does not need to be essentially performed in steps 10015 and 10025. The process may be performed in any of steps 10000 to 10040 in FIG. 10.

Referring to FIG. 10, in step 10025, the RSP server 1090 may prepare a profile to be transmitted to the target device 1050.

In this case, the prepared profile may be any one of the following two cases:

A profile having the same credential as the profile used by the source device 1010; and
A profile having a credential different from that of the profile used by the source device 1010.

For example, if it is identified that the profile has been deleted in the source device through step 10020, the RSP server 1090 may prepare to transmit a profile having the same credential as a profile (i.e., a deleted profile) used by the source device. For another example, if the profile has not been deleted in the source device 1010, the RSP server 1090 may prepare to transmit a profile having a credential different from that of a profile used by the source device 1010.

The prepared profile may be a profile capable of operating in a terminal operating according to the "device change of first version."

Some of and/or the entire prepared profile may be encrypted for encryption communication between the RSP server 1090 and the target device 1050. In this case, in order to generate an encryption key for the encryption communication between the RSP server 1090 and the target device 1050, otPK.EUICC.KA transmitted from the target device 1050 to the RSP server 1090 in step 10015 may be used. The profile some of and/or the entire thereof has been encrypted using the generated encryption key may be denoted as a "bound profile package."

Referring to FIG. 10, in step 10030, the RSP server 1090 may transmit, to the target device 1050, the "bound profile package" prepared in step 10025.

Referring to FIG. 10, in step 10035, the target device 1050 may install the profile by using the "bound profile package" received in step 10030.

Referring to FIG. 10, in step 10040, the target device 1050 may notify the RSP server 1090 that the profile has been installed.

Figure 11:
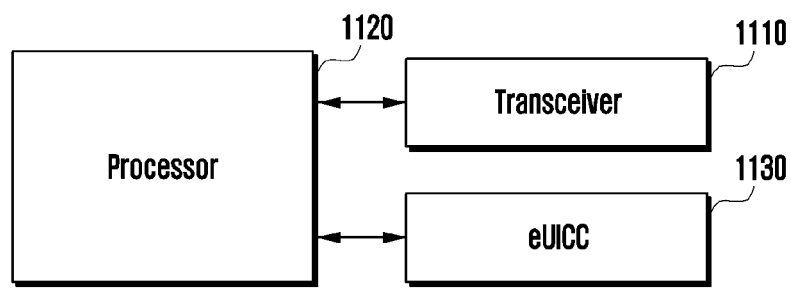
FIG. 11 is a diagram illustrating a structure of a device on which an embedded universal integrated circuit card (eUICC) has been mounted according to an embodiment of the present disclosure.

FIG. 11 is a diagram illustrating a structure of a device on which an eUICC has been mounted according to an embodiment of the disclosure.

Referring to FIG. 11, the device may include a transceiver 1110, a processor 1120 and an eUICC 1130. Some of the devices described in the disclosure may correspond to the device described with reference to FIG. 11. However, a configuration of the device is not limited to the configuration of FIG. 11, and may include more components than the components illustrated in FIG. 11 and include less components than the components illustrated in FIG. 11. According to an embodiment of the disclosure, the transceiver 1110, the processor 1120 and the eUICC 1130 may be implemented in the form of a chip. Furthermore, the device may additionally include a memory. The processor 1120 may be configured as at least one processor.

According to various embodiments, the transceiver 1110 may transmit and receive signals, information, data, etc. according to various embodiments of the disclosure to and from the transceiver of another device or an external server. The transceiver 1110 may include an RF transmitter for up-converting and amplifying the frequency of a transmitted signal, an RF receiver for performing low noise amplification on a received signal and down-converting the frequency of the received signal, etc. However, this is merely an embodiment of the transceiver 1110, and components of the transceiver 1110 are not limited to the RF transmitter and the RF receiver. Furthermore, the transceiver 1110 may receive a signal through a wireless channel, may output the signal to the processor 1120, and may transmit, through the wireless channel, a signal outputted by the processor 1120.

The processor 1120 is a component for generally controlling the device. The processor 1120 may control an overall operation of the device according to the aforementioned various embodiments of the disclosure.

The device may further include a memory (not illustrated). The memory may store data, such as a basic program for an operation of the device, an application program or configuration information. Furthermore, the memory may include at least one storage medium may include at least one storage medium among a flash memory type, a hard disk type, a multimedia card micro type, a card type memory (e.g., an SD or XD memory), a magnetic memory, a magnetic disk, an optical disk, a random access memory (RAM), a static random access memory (SRAM), a read-only memory (ROM), a programmable read-only memory (PROM), or an electrically erasable programmable read-only memory (EEPROM). Furthermore, the processor 1120 may perform various operations by using various programs, content, data, etc. stored in the memory.

Figure 12:
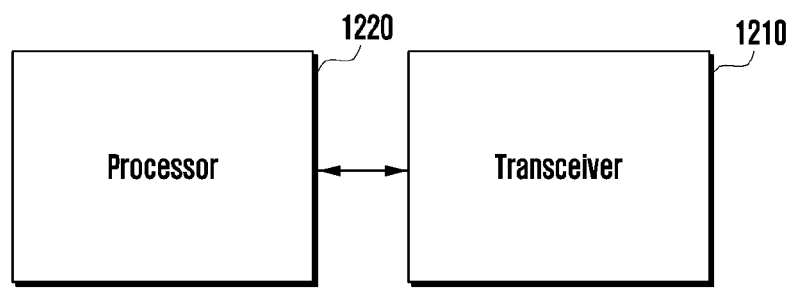
FIG. 12 is a diagram illustrating a structure of a remote subscriber identity module (SIM) provisioning (RSP) server according to an embodiment of the present disclosure.

FIG. 12 is a diagram illustrating a structure of an RSP server according to an embodiment of the present disclosure.

Referring to FIG. 12, the server may include a transceiver 1210 and a processor 1220. Some of the server(s) described in the disclosure may correspond to the server described with reference to FIG. 12. However, a configuration of the server is not limited to the configuration of FIG. 12, and may include more components than the components illustrated in FIG. 12 and include less components than the components illustrated in FIG. 12. According to some embodiments, the transceiver 1210 and the processor 1220 may be implemented in the form of a chip. Furthermore, the server may additionally include a memory. The processor 1220 may be configured as at least one processor.

According to an embodiment of the disclosure, the transceiver 1210 may transmit and receive signals, information, data, etc. according to various embodiments of the disclosure to and from a device. The transceiver 1210 may include an RF transmitter for up-converting and amplifying the frequency of a transmitted signal, an RF receiver for performing low noise amplification on a received signal and down-converting the frequency of the received signal, etc. However, this is merely an embodiment of the transceiver 1210, and components of the transceiver 1210 are not limited to the RF transmitter and the RF receiver. Furthermore, the transceiver 1210 may receive a signal through a wireless channel, may output the signal to the processor 1220, and may transmit, through the wireless channel, a signal outputted by the processor 1220.

At least one processor 1220 is a component for generally controlling the server. The processor 1220 may control an overall operation of the server according to the aforementioned various embodiments of the disclosure. The at least one processor 1220 may be named a controller.

The server may further include a memory (not illustrated). The memory may store data, such as a basic program for an operation of the server, an application program or configuration information. Furthermore, the memory may include at least one storage medium may include at least one storage medium among a flash memory type, a hard disk type, a multimedia card micro type, a card type memory (e.g., an SD or XD memory), a magnetic memory, a magnetic disk, an optical disk, a random access memory (RAM), a static random access memory (SRAM), a read-only memory (ROM), a programmable read-only memory (PROM), or an electrically erasable programmable read-only memory (EEPROM). Furthermore, the processor 1220 may perform various operations by using various programs, content, data, etc. stored in the memory.

In the aforementioned detailed embodiments of the disclosure, the components included in the disclosure have been expressed in the singular or plural form depending on a provided detailed embodiment. However, the singular or plural expression has been selected suitably for a situation provided for convenience of description, and the disclosure is not limited to singular or plural components. Although a component has been expressed in the plural form, it may be configured in the singular form. Although a component has been expressed in the singular form, it may be configured in the plural form.

Although the detailed embodiments have been described in the detailed description of the disclosure, the disclosure may be modified in various ways without departing from the scope of the disclosure. Accordingly, the scope of the disclosure should not be limited to the aforementioned embodiments, but should be defined by not only the claims, but equivalents thereof.

Various embodiments of the disclosure and the terms used in the embodiments are not intended to limit the technology described in the disclosure to a specific embodiment, but should be construed as including various changes, equivalents and/or alternatives of a corresponding embodiment. Regarding the description of the drawings, similar reference numerals may be used in similar components. An expression of the singular number may include an expression of the plural number unless clearly defined otherwise in the context. In the disclosure, an expression, such as "A or B", "at least one of A and/or B", "A, B or C" or "at least one of A, B and/or C", may include all of possible combinations of listed items together. Expressions, such as "a first," "a second," "the first" or "the second", may modify corresponding components regardless of its sequence or importance, and are used to only distinguish one component from the other component and do not limit corresponding components. When it is described that one (e.g., a first) component is "(functionally or communicatively) connected to" or "coupled with" the other (e.g., a second) component, one component may be directly connected to the other component or may be connected to the other component through another component (e.g., a third component).

The term "module" used in the disclosure includes a unit configured as hardware, software or firmware, and may be interchangeably used with a term, such as logic, a logical block, a part or a circuit. The module may be an integrated part, a minimum unit to perform one or more functions, or a part thereof. For example, the module may be configured as an application-specific integrated circuit (ASIC).

Various embodiments of the disclosure may be implemented as software (e.g., a program) including instructions stored in machine (e.g., computer)-readable storage media (e.g., an internal memory or an external memory). A device is an apparatus which may invoke a stored instruction from the storage media and may operate in response to the invoked instruction, and may include a device according to various embodiments of the disclosure. When the instruction is executed by a processor (e.g., the processor 1120 in FIG. 11 or the processor 1220 in FIG. 12), the processor may perform a function, corresponding to the instruction, directly or by using other components under the control of the processor. The instruction may include a code generated or executed by a compiler or an interpreter.

The machine-readable storage media may be provided in the form of a non-transitory storage medium. In this case, "non-transitory" merely means that the storage media do not include a signal and are tangible, and does not distinguish between cases where data is semi-permanently or temporally stored in the storage media.

The method according to various embodiments disclosed in the disclosure may be included in a computer program product and provided. The computer program product may be traded as a product between a seller and a buyer. The computer program product may be distributed in the form of a device-readable storage medium (e.g., a compact disc read only memory (CD-ROM)) or through an app store (e.g., PlayStore™) online. In the case of the online distribution, at least some of the computer program product may be at least temporarily stored or provisionally generated in storage media, such as a memory in a server of a manufacturer, a server of an app store or a relay server. Each of the components (e.g., modules or programs) according to various embodiments may consist of a single entity or a plurality of entities. Some of the aforementioned corresponding sub-elements may be omitted or other sub-elements may be further included in various embodiments. Alternatively or additionally, some components (e.g., modules or programs) may be integrated into a single entity. The single entity may perform a function performed by each of corresponding components before they are integrated identically or similarly. Operations performed by a module, a program or other components according to various embodiments may be executed sequentially, in parallel, repeatedly or heuristically, or at least some operations may be executed in different orders or may be omitted, or other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first device of a first version in a communication system, the method comprising:
    identifying that a profile of the first device is to be downloaded in a second device of the first version or a second version;
    identifying, based on a first code for the first version and a second code for the second version, a third code used for downloading the profile of the first device;
    transmitting, to the second device, the third code; and
    transmitting, to a profile server, the profile of the first device based on a transmission of the third code,
    wherein the third code includes the first code for the first version and the second code for the second version,
    wherein the first code is a transfer code used by the second device of the first version to download the profile of the first device, and
    wherein the second code is an activation code used by the second device of the second version to download the profile of the first device.

2. The method of claim 1, wherein:
    the first code includes at least one of information indicating the profile, address information of the profile server, information associated with the first device, or information on an available option for downloading the profile in the second device, and
    the second code includes at least one of information indicating a format of the second code, address information of the profile server, information indicating the profile, or information indicating that the profile is deleted or suspended in the first device.

3. The method of claim 1, further comprising:
    receiving, from the profile server, a request for deleting the profile of the first device.

4. A method performed by a second device of a first version or a second version in a communication system, the method comprising:
    receiving, from a first device of the first version, a third code used for downloading a profile of the first device, wherein the third code is identified based on a first code for the first version and a second code for the second version;
    in case that a version of the second device is the first version, transmitting, to a profile server, the first code from the third code;
    in case that the version of the second device is the second version, transmitting, to the profile server, the second code from the third code; and
    receiving, from the profile server, the profile of the first device based on a transmission of the first code or the second code,
    wherein the third code includes the first code for the first version and the second code for the second version,
    wherein the first code is a transfer code used by the second device of the first version to download the profile of the first device, and
    wherein the second code is an activation code used by the second device of the second version to download the profile of the first device.

5. The method of claim 4, wherein:
    the first code includes at least one of information indicating the profile of the first device, address information of the profile server, information associated with the first device, or information on an available option for downloading the profile of the first device in the second device, and
    the second code includes at least one of information indicating a format of the second code, the address information of the profile server, the information indicating the profile of the first device, or information indicating that the profile of the first device is deleted or suspended in the first device.

6. A method performed by a profile server in a communication system, the method comprising:
    receiving, from a second device of a first version or a second version, one of a first code or a second code;

identifying a version of a first device in which a profile of the first device is to be downloaded in the second device is installed based on the first code or the second code;

receiving, from the first device, the profile of the first device based on an identification for the version of the first device; and transmitting, to the second device, the profile, wherein a third code includes the first code for the first version and the second code for the second version, wherein the first code is a transfer code used by the second device of the first version to download the profile of the first device, and wherein the second code is an activation code used by the second device of the second version to download the profile of the first device.

7. The method of claim 6, further comprising:

in case that a version of the second device is the first version, receiving the first code, and in case that a version of the second device is the second version, receiving the second code.

8. The method of claim 7, wherein:

the first code includes at least one of information indicating the profile of the first device, address information of the profile server, information associated with the first device, or information on an available option for downloading the profile of the first device in the second device, and the second code includes at least one of information indicating a format of the second code, the address information of the profile server, the information indicating the profile of the first device, or information indicating that the profile of the first device is deleted or suspended in the first device.

9. The method of claim 6, further comprising:

in case that the version of the first device is the first version, transmitting, to the first device, a request for deleting the profile of the first device.

10. A first device of a first version in a communication system, the first device comprising:

a transceiver; and a processor operably connected to the transceiver, the processor configured to:

identify that a profile of the first device is to be downloaded in a second device of the first version or a second version, identify, based on a first code for the first version and a second code for the second version, a third code used for downloading the profile of the first device, transmit, to the second device via the transceiver, the third code, and transmit, to a profile server via the transceiver, the profile of the first device based on a transmission of the third code, wherein the third code includes the first code for the first version and the second code for the second version, wherein the first code is a transfer code used by the second device of the first version to download the profile of the first device, and wherein the second code is an activation code used by the second device of the second version to download the profile of the first device.

11. The first device of claim 10, wherein:

the first code includes at least one of information indicating the profile of the first device, address information of the profile server, information associated with the first device, or information on an available option for downloading the profile of the first device in the second device, and the second code includes at least one of information indicating a format of the second code, the address information of the profile server, the information indicating the profile of the first device, or information indicating that the profile of the first device is deleted or suspended in the first device.

12. The first device of claim 10, wherein the processor is further configured to:

receive, from the profile server via the transceiver, a request for deleting the profile of the first device.

13. A second device of a first version or a second version in a communication system, the second device comprising:

a transceiver; and a processor operably connected to the transceiver, the processor configured to:

receive, from a first device of the first version via the transceiver, a third code used for downloading a profile of the first device, wherein the third code is identified based on a first code for the first version and a second code for the second version, in case that a version of the second device is the first version, transmit, to a profile server via the transceiver, the first code from the third code, in case that the version of the second device is the second version, transmit, to the profile server via the transceiver, the second code from the third code, and receive, from the profile server via the transceiver, the profile of the first device based on a transmission of the first code or the second code, wherein the third code includes the first code for the first version and the second code for the second version, wherein the first code is a transfer code used by the second device of the first version to download the profile of the first device, and wherein the second code is an activation code used by the second device of the second version to download the profile of the first device.

14. The second device of claim 13, wherein:

the first code includes at least one of information indicating the profile of the first device, address information of the profile server, information associated with the first device, or information on an available option for downloading the profile of the first device in the second device, and the second code includes at least one of information indicating a format of the second code, the address information of the profile server, the information indicating the profile of the first device, or information indicating that the profile of the first device is deleted or suspended in the first device.

15. A profile server in a communication system, the profile server comprising:

a transceiver; and a processor operably connected to the transceiver, the processor configured to:

receive, from a second device of a first version or a second version via the transceiver, a first code or a second code, identify a version of a first device in which a profile of the first device to be downloaded in the second device is installed based on the first code or the second code, receive, from the first device via the transceiver, the profile of the first device based on an identification for the version of the first device; and transmit, to the second device via the transceiver, the profile of the first device, wherein a third code includes the first code for the first version and the second code for the second version, wherein the first code is a transfer code used by the second device of the first version to download the profile of the first device, and wherein the second code is an activation code used by the second device of the second version to download the profile of the first device.

16. The profile server of claim 15, wherein the processor is further configured to:
in case that a version of the second device is the first version, receive the first code, and
in case that a version of the second device is the second version, receive the second code.

17. The profile server of claim 16, wherein:
the first code includes at least one of information indicating the profile of the first device, address information of the profile server, information associated with the first device, or information on an available option for downloading the profile of the first device in the second device, and
the second code includes at least one of information indicating a format of the second code, the address information of the profile server, the information indicating the profile of the first device, or information indicating that the profile of the first device is deleted or suspended in the first device.

18. The profile server of claim 15, wherein the processor is further configured to:
in case that the version of the first device is the first version, transmit, to the first device via the transceiver, a request for deleting the profile of the first device.

* * * * *